(12) United States Patent
Cruze et al.

(10) Patent No.: US 10,589,956 B1
(45) Date of Patent: Mar. 17, 2020

(54) RETRIEVER DEVICE AND METHOD

(71) Applicant: 51 Enterprises, LLC, Knoxville, TN (US)

(72) Inventors: Guille Cruze, Knoxville, TN (US); Jim Griffith, Knoxville, TN (US); Benjamin D. Nibali, Maryville, TN (US); Kristopher C. Hall, Maryville, TN (US); Lukas R. Bearden, Knoxville, TN (US); Gary Mitchell, Knoxville, TN (US)

(73) Assignee: 51 Enterprises, LLC, Knoxville, TN (US)

( * ) Notice: Subject to any disclaimer, the term of this patent is extended or adjusted under 35 U.S.C. 154(b) by 638 days.

(21) Appl. No.: 15/226,404

(22) Filed: Aug. 2, 2016

Related U.S. Application Data

(60) Provisional application No. 62/200,206, filed on Aug. 3, 2015.

(51) Int. Cl.
*B65H 75/30* (2006.01)
*B60P 3/10* (2006.01)
(Continued)

(52) U.S. Cl.
CPC ............ *B65H 75/30* (2013.01); *B60P 3/1066* (2013.01); *B65H 75/425* (2013.01); *B65H 75/4463* (2013.01)

(58) Field of Classification Search
CPC .. B65H 75/30; B65H 75/425; B65H 75/4463; B65H 75/486; B60P 3/1066; B66D 5/16
See application file for complete search history.

(56) References Cited

U.S. PATENT DOCUMENTS

| | | | | |
|---|---|---|---|---|
| 1,848,972 A | * | 3/1932 | Peebles | A01B 3/64 254/273 |
| 1,908,852 A | * | 5/1933 | Lea | B65H 75/38 242/385.1 |

(Continued)

*Primary Examiner* — Sang K Kim
*Assistant Examiner* — Nathaniel L Adams
(74) *Attorney, Agent, or Firm* — Luedeka Neely Group, P.C.

(57) ABSTRACT

A tether line is mounted in a retriever and, when a water vessel is launched into the water, the retriever applies a tension force to the tether line. After the water vessel is launched, the tension on the tether line pulls the water vessel from its launched floating position towards the stationary object. The retriever is rotatably mounted on the water vessel or the stationary object such that it will pivot around a vertical axis and point in a direction towards and along the tether line. A spool mounted on the structural unit holds the tether line, and an electrical or mechanical motor, such as a spring B-motor, places a torque on the spool and a tension on the tether line. After the water vessel is launched, the tension force from the motor pulls the water vessel from a launched position to the stationary object. A self-governing control mechanism in the retriever senses at least one operating parameter of the retriever and limits the retrieval of the tether line to within predetermined operating conditions. The self-governing control mechanism may sense the tension on the tether line and stop retrieval of the tether line when the tension on the tether line drops below a predetermined tension. The self-governing control mechanism may also (or alternatively) sense the speed of the spool and apply a brake force proportional to the spool's rotational speed.

18 Claims, 18 Drawing Sheets

(51) Int. Cl.
*B65H 75/42* (2006.01)
*B65H 75/44* (2006.01)

(56) References Cited

U.S. PATENT DOCUMENTS

| | | | | |
|---|---|---|---|---|
| 2,462,972 | A | * | 3/1949 | Johnson .................. B66D 1/50 |
| | | | | 254/272 |
| 2,945,921 | A | | 7/1960 | Belicka et al. |
| 3,069,107 | A | * | 12/1962 | Hirt ........................ B65H 59/04 |
| | | | | 242/421.8 |
| 3,568,802 | A | | 3/1971 | Marshall |
| 4,081,153 | A | | 3/1978 | Tanaka et al. |
| 4,917,362 | A | * | 4/1990 | Wilson .................. B65H 75/40 |
| | | | | 254/134.3 FT |
| 5,078,541 | A | | 1/1992 | Gola |
| 5,154,564 | A | | 10/1992 | Koch |
| 6,019,304 | A | | 2/2000 | Skowronski et al. |
| 6,149,096 | A | * | 11/2000 | Hartley ................. B65H 75/40 |
| | | | | 191/12.2 A |
| 6,234,417 | B1 | | 5/2001 | Sauder et al. |
| 7,370,843 | B2 | | 5/2008 | Dueck |
| 8,764,343 | B1 | | 7/2014 | Hawkins, Sr. et al. |
| 2004/0026557 | A1 | | 2/2004 | Lilly |
| 2013/0058516 | A1 | | 3/2013 | Sullivan et al. |
| 2013/0068870 | A1 | | 3/2013 | Feldstein et al. |

* cited by examiner

RETRIEVER DEVICE AND METHOD

FIELD

This invention relates to the field of retrievers particularly water vessel (i.e. ski boats, bass boats, jon boats, sailboats, jet skis, canoes, etc.) launching, docking, mooring, and loading devices. More particularly, this invention relates to a self-governing method and apparatus for launching, docking, mooring, and loading a water vessel with a device that allows a tether line to be pulled from the device, and then retrieves the tether line during the process of launching, docking, mooring, or loading a water vessel off of, or onto, a trailer or other stationary floating object.

CROSS-REFERENCE TO RELATED APPLICATION

This application claims priority to provisional application No. 62/200,206, filed Aug. 3, 2015, entitled Retriever Device for Launching, Docking and Loading a Water Vessel, invented by Guille Cruze and Jim Griffith, which is incorporated by reference as if fully set forth herein.

SUMMARY

In accordance with the present invention, a retriever is provided for conveniently launching, docking, mooring, or loading a water vessel. A tether line is mounted in the retriever and is attached to a stationary object connected to dry land—or other stationary floating object—and the water vessel. As an example, when a water vessel is launched from its trailer into the water, the retriever applies a designed tension force to the tether line—for the commensurate size water vessel and respective environmental conditions—which both allows the water vessel to flow freely from its trailer and subsequently store the energy needed to pull the water vessel from its launched floating position towards the stationary object—in a controlled self-governing fashion. The retriever may include a fixed rotating mount so that the retriever may be mounted on either the water vessel or the stationary object in a position such that it will pivot around a vertical axis. Thus, as tension is applied to the tether line, the retriever will point itself in a direction towards and along the tether line towards the stationary object, or vice versa, depending on whether the retriever is mounted on the water vessel or the stationary object.

The retriever device includes a structural unit and the tether line extends from the unit. The tether line is dimensioned to have a length and strength for the particular class of water vessel being launched. For example, such a water vessel having a length between 14 and 24 feet would preferably have a tether line with a tensile strength of 1500 pounds and a length of between 75 and 100 feet. A spool is mounted for rotation on the structural unit and is dimensioned to hold said tether line. A motor, such as a spring B-motor or electrically driven motor, is mounted on the structural unit and connected to the spool. The motor is configured to place a tension on the tether line, but the motor is also configured to allow the force of launching the water vessel from the trailer to overcome the tension force applied by the motor. After the water vessel is launched and is floating in the water, the tension force from the motor is chosen to be sufficiently strong to pull the water vessel from a launched position floating in the water to the stationary object in a controlled fashion. A self-governing control mechanism is provided in the retriever to sense at least one operating parameter of the retriever, and the control mechanism responds to the sensed operating parameter to limit the retrieval of the tether line to within predetermined operating conditions. For example, the self-governing control mechanism may be configured to sense the tension on the tether line and to engage and stop retrieval of the tether line when the tension on the tether line drops below a predetermined tension. The self-governing control mechanism may also or alternatively be configured to sense the rotational speed of the spool and to apply a brake force to the spool that increases with the rotational speed of the spool. Thus, the self-governing control mechanism will either slow or stop the retrieval of the tether line.

In one embodiment, the self-governing control mechanism of the retriever includes a stop mechanism that is movably mounted on the structural unit adjacent to the tether line. An engagement structure is formed on the stop mechanism to engage and stop the movement of the tether line in a retrieval direction. The self-governing control mechanism further includes a force actuator that is mounted on the structural unit and is disposed to urge the engagement structure towards the tether line. A lift structure is disposed on the stop mechanism for lifting the engagement structure in a direction away from the tether line. These mechanisms are configured so that the engagement structure is lifted away from the tether line when tension is sensed on the tether line above a predetermined amount and the engagement structure is urged to engage the tether line and stop retrieval of the tether line when tension on the tether line is below the predetermined amount.

In another embodiment, the self-governing control mechanism may also include or alternatively include an adjustable viscous damper that applies a driving force or a brake force to the spool and governs the speed of the spool when the motor is retrieving the tether line into the spool. This brake force—or resistance—will increase in proportion to the speed of the spool.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
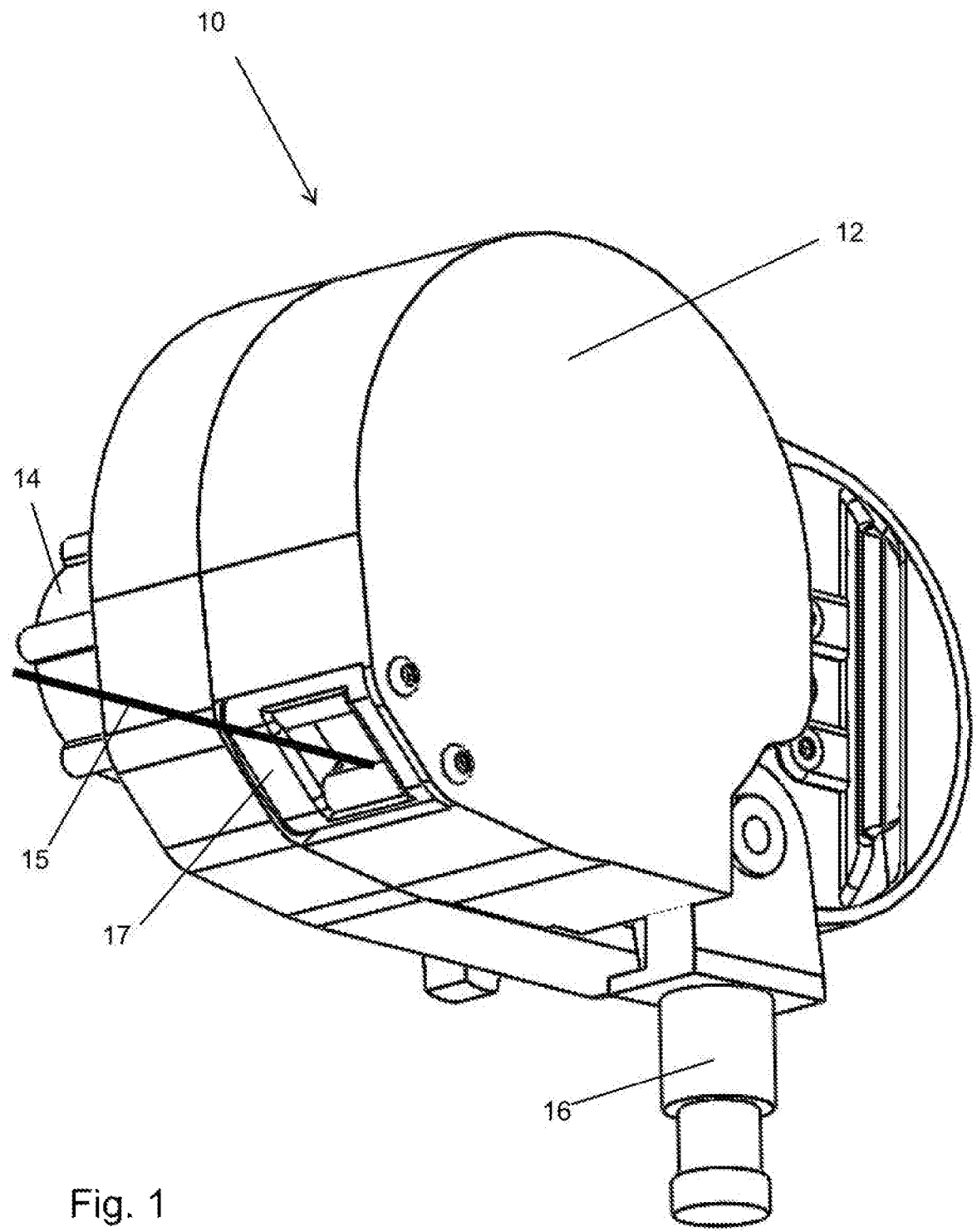
FIG. 1 is a front perspective view of the water vessel retriever device showing the tether line 15 and tether line guide 17.

Referring now to the drawings in which like reference characters designate like or corresponding parts throughout the several views, there is shown in FIG. 1 a front perspective view of a water vessel retriever device 10 contained within a case 12. The device 10 includes a speed limiter 14, and a pivotal rotary mount 16. A tether line 15 is attached to an interior spool and extends through the tether line guide 17. To launch a water vessel, the pivotal rotary mount 16 is first placed in a pivotal rotary receiver which is attached to a water vessel, a dock, other stationary floating, or an on-land structure. The pivotal rotary mount 16 allows the device 10 to rotate freely about the axis of the mount 16. The rotation allows the device 10 and tether line guide 17 to always point in the direction of the tether line, which is also the direction of the force applied by the tether line 15 to the device 10.

The speed limiter 14 controls the maximum speed at which the tether line 15 may be retracted into the device 10. This acts as a safety feature to prevent the tether line from being too rapidly retrieved in the event it is accidentally released when a substantial amount of tether line has been extracted from the device 10. Also, the speed limiter can regulate the maximum speed at which a water vessel is retrieved towards a dock or other mooring point either on, or off, shore. In the embodiment shown in FIG. 1, the speed controller 14 is adjustable and can be adjusted within an allowable range to meet the preferences of a particular user and/or water vessel class. In this embodiment, the speed limiter allows an adjustment so that the maximum speed of tether line retrieval may be adjusted between 3 feet per second and 35 feet per second with zero load on the tether line regardless of the amount of tether line extracted.

As will be explained in greater detail hereinafter, the device 10 may be powered by a (or multiple) constant torque spring(s). However, the speed limiter 14 limits the speed of retrieval based on rotations per second of the spool 22. The speed limiter 14 is set to allow minimum resistance at low rotations/sec and high resistance (a desired governed rps) at high rotations/sec.

Figure 2:
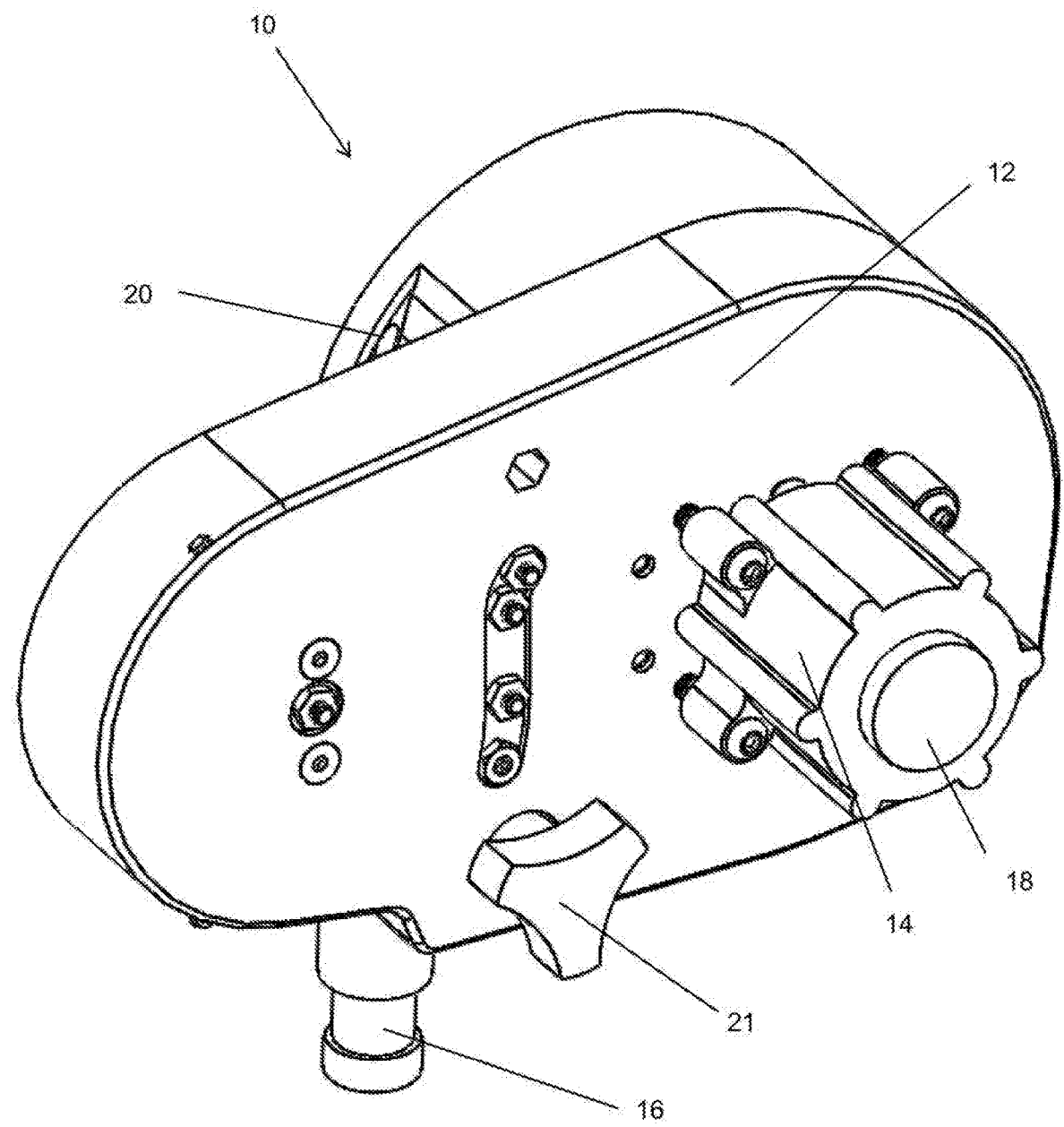
FIG. 2 is a rear perspective view of the water vessel retriever device showing a side mounted viscous speed limiter 14.

Referring to FIG. 2, the opposite side of the device 10 is shown as compared to FIG. 1. In this view, the speed limiter 14 is more clearly shown. A knob 18 is provided on the speed limiter 14 to allow adjustment of the speed limiter as desired by the user. Also in FIG. 2 a ratchet lock 20 is shown. The ratchet lock 20 may be manipulated to "on and off" positions to engage and disengage a ratchet mechanism. When the ratchet mechanism is engaged (or "on"), it will allow the tether line 15 to be extracted out of the spool 22, but not allow tether line 15 to retract. When the ratchet mechanism is disengaged (or "off"), tether line 15 can be extracted from or retracted into the device 10 without interference from the ratchet mechanism.

Figure 3:
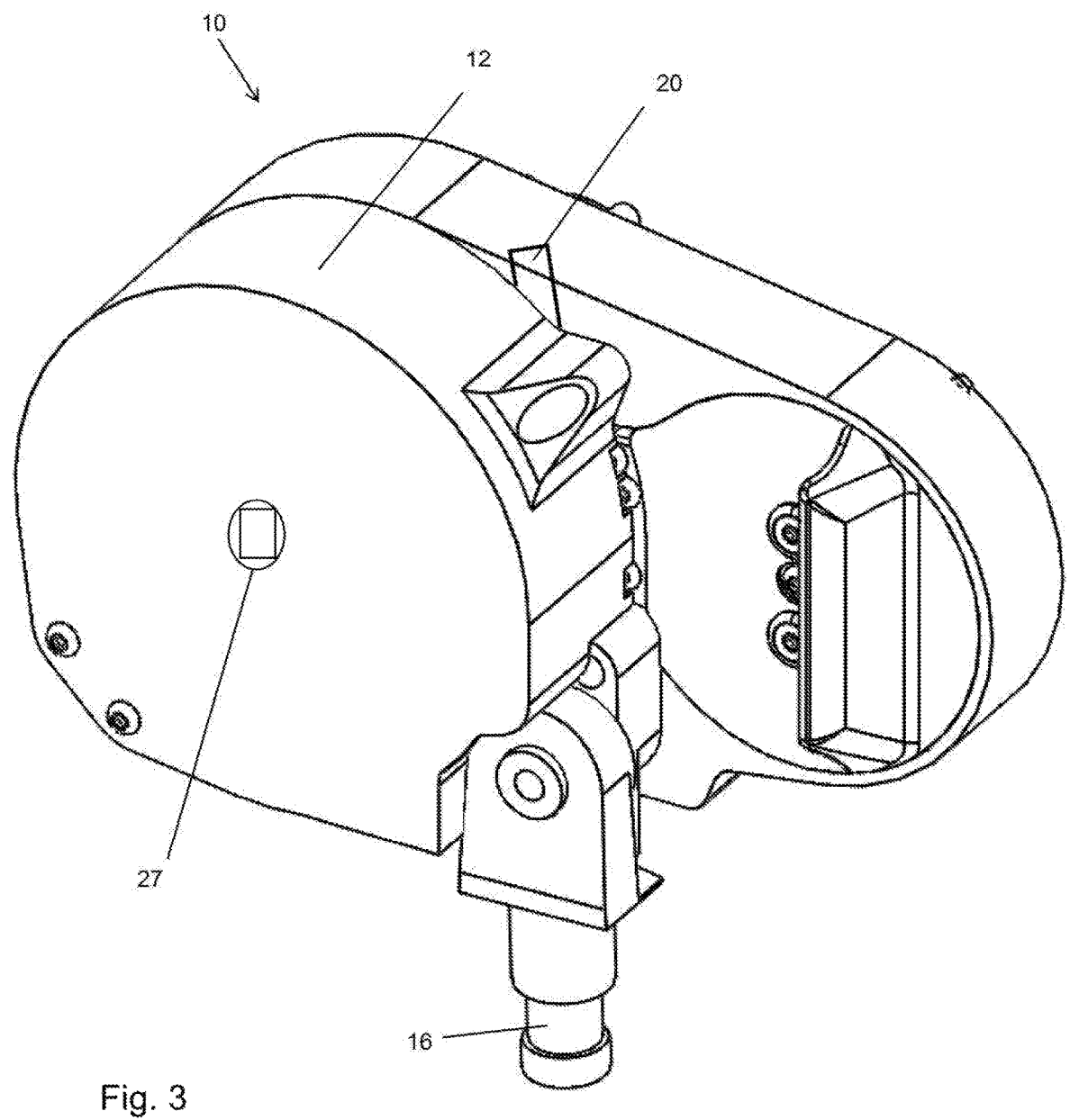
FIG. 3 is another rear perspective view of the water vessel retriever device showing the side opposite from that shown in FIG. 2.

FIG. 3 is a view of the opposite side of the device 10 as compared to FIG. 2. In this view, the ratchet lock 20 is more clearly visible. Also, a drive socket 27 is shown in the side of the case 12. The drive socket 27 in this embodiment is a square socket designed to receive a square shaft. It can also be any other type socket, such as a hexagon shaped socket or a star socket. The socket 27 is coaxial with the tether line spool 22 (shown in FIG. 4) and is rigidly connected to the tether line spool 22 to provide a supplemental drive input to the tether line spool 22. As will hereinafter be described in greater detail, the tether line spool 22 is typically driven by a motor. However, in the event of a failure or another emergency, a supplemental drive may be implemented by inserting a supplemental driver into the socket 27. For example, a drive shaft having a square head could be mounted in a variable speed electric drill, and the drill could be used to drive the tether line spool 22 forward or backwards by inserting the square head into the socket 27. Likewise, a hand crank may be provided as a supplemental drive as well. The hand crank would have a drive head configured to fit within the socket 27. In yet another embodiment, an electric motor may be permanently mounted on the exterior of the retriever device 10 with a drive shaft engaging the socket 27. When the device is operated by the force of the spring, the electric motor will be allowed to free wheel and will apply no force through the socket 27. When turned on, however, the electric motor is configured to drive the socket 27 in both rotational directions. Preferably, the electric motor will be powered by batteries. With either an electric drill or a crank or another driver, the drive head may be held in place in the socket 27 by a socket retention mechanism such as a spring biased ball and detent mechanism.

Referring to FIGS. 1-4 the case 12 of the device 10 may be transparent to allow observation of the spring 26, spool 22, and ratchet lock 20 within the case. The transparent case is functional in several ways. First, it allows observation of a constant torque spring 26. As the tether line is pulled (extracted) from the device 10, the spring 26 is transferred (unwound) from its storage position and is wound on to the spring torque output drum 24. By observing the size of the wound spring 26, the user will know how much tether line has been extracted from the device 10 and more importantly how much tether line remains on the spool.

Also, the transparency of case will allow the user to observe malfunctions, such as a tangle in the tether line 15 when the tether line is wound upon the tether line spool 22. If the tether line 15 is subjected to an entanglement on the spool 22, it can be observed through the transparent case 12. Thus, the user can determine quickly the cause of a jam. By carefully manipulating the tether line 15 through the tether line guide 17, and perhaps by using probes, a minor jam can be corrected without removing the case 12 from the apparatus. Since the speed of the tether line 15 is limited by the speed limiter 14, jams and entanglements are rare. If a jam occurs, it will usually be a minor entanglement that can be corrected without removing the case 12.

The preferred type of spring is a B-Motor constant torque spring. The preferred type of constant torque spring is a pre-stressed material in the form of a tightly wound spiral and is placed on two drums—a storage and output drum. The spring's constant torque is produced by winding the spiral from the storage drum to the torque output drum, and the pre-stressed curvature of the material is reversed. By winding the spring, a constant torque is developed due to the pre-stressed tension (free-coil) of the material plus the reverse bending moment of the spiral.

Figure 4:
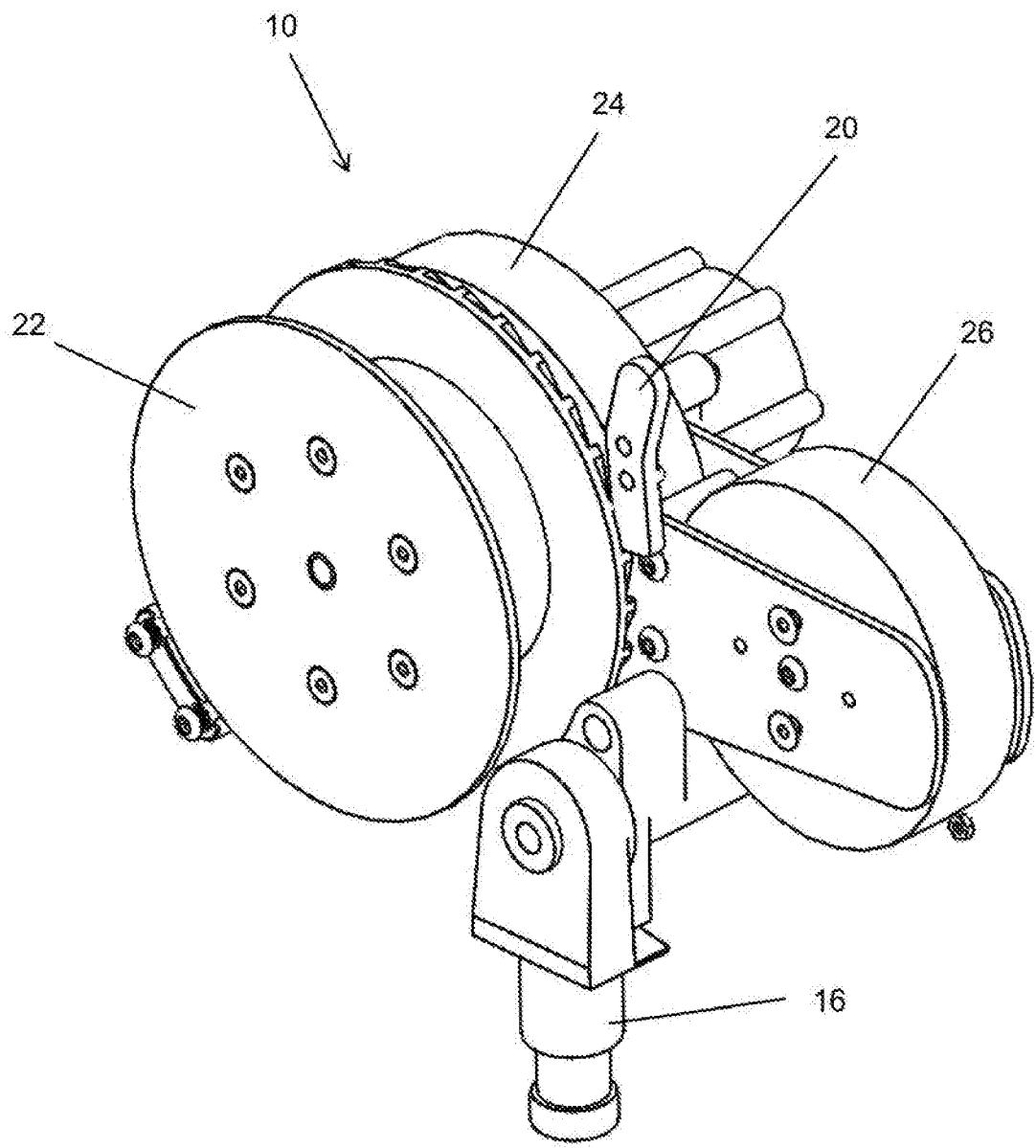
FIG. 4 is a somewhat diagrammatic perspective view of the water vessel retriever device with the case of device 10 shown as transparent or removed to illustrate the tether line spool 22 and the constant torque spring 26 and spring output drum 24 within the cover 12.

With continued reference to FIG. 4, the operation of the spring 26 may best be understood. As the tether line 15 is extracted from the spool 22, the tether line spool 22 rotates, and the line spool 22 rotates the spring torque output drum 24, to which it is coaxial and rigidly connected. The rotating torque output drum 24 pulls the spring 26 onto the torque output drum and thereby unwinds the spring 26. The unwinding action is resisted by a pre-stressed tension (constant torque) of the spring B-motor 26. So, for example, when a water vessel is being launched into the water from the trailer, the movement and momentum of the water vessel will pull the tether line from the line spool 22 which in turn will pull the constant torque spring 26 onto the torque output drum 24. When the water vessel is launched into the water, the spring 26 will apply a constant torque to the torque output drum 24, which will apply the torque to the tether line spool 22, which will apply a force to the tether line 15 pulling on the tether line and causing the water vessel to move in the water towards the dock or shore where the opposite end of the tether line is secured. Thus, the composed spring 26 begins to pull the water vessel back to the dock, or other structure, overcoming the forces of wind or water on the water vessel. The speed with which the water vessel is retrieved is limited by the speed limiter 14 and as mentioned before, the force on the tether line will naturally diminish as the tether line 15 is fully retracted. Thus the design of the device 10 will limit the speed with which the water vessel is retrieved, particularly as it approaches its destination point. The spring B-motor 26 may be manufactured to exaggerate the increasing force on the tether line as more tether line is withdrawn from the retriever device so that a desired increased amount of tether line force is generated when the tether line is fully extracted from the retriever device 10 and a desired decreased amount of force on the tether line is generated when the tether line is fully retrieved.

Figure 5:
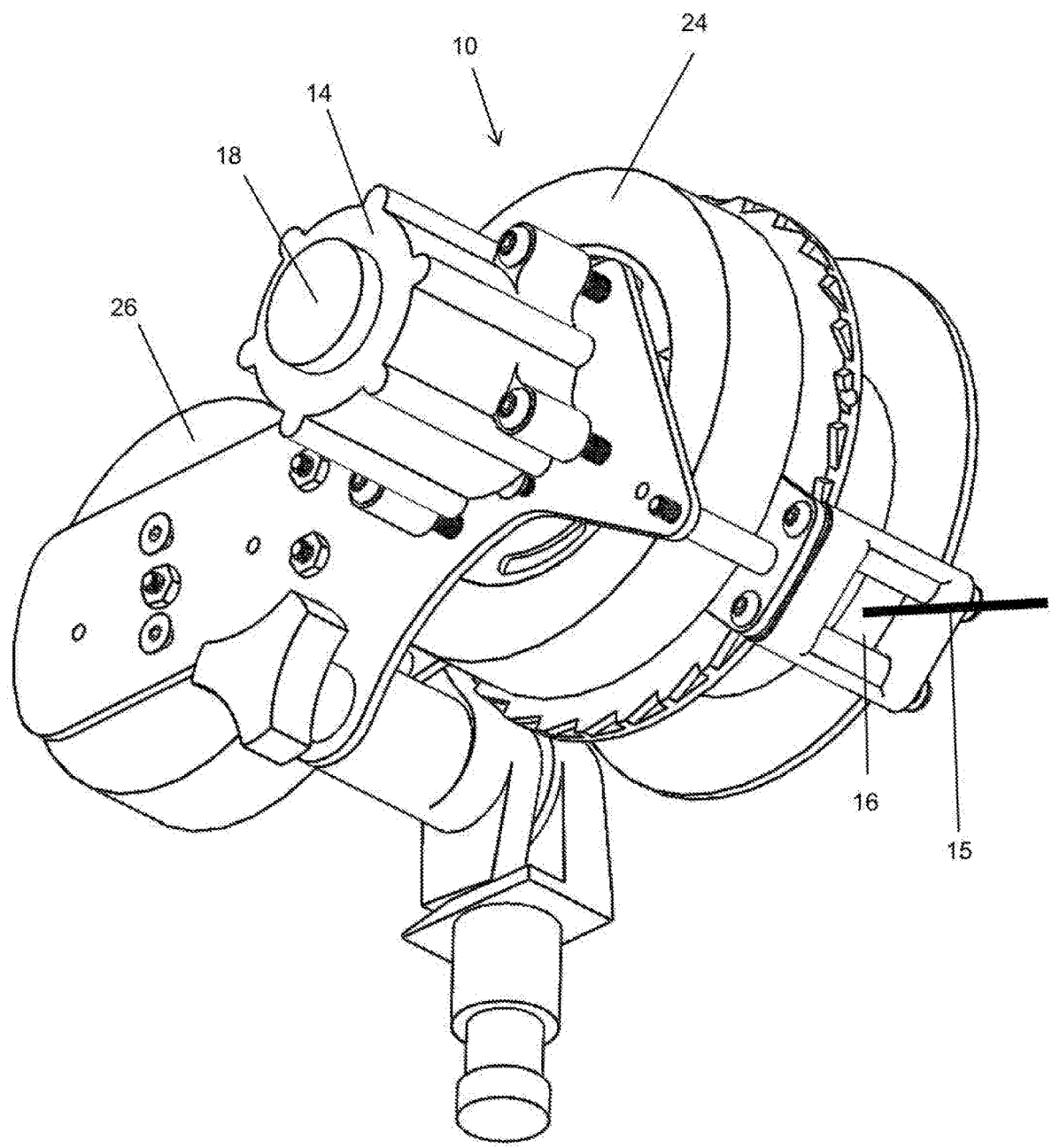
FIG. 5 is a somewhat diagrammatic perspective view of the water vessel retriever device with the cover of the apparatus shown as transparent or removed to illustrate the interior features of the device.

Referring to FIG. 5, the retriever device 10 is shown in a view that is approximately 180° rotated with respect to FIG. 4. In this view, it may be best appreciated that the spring coil and torque output drum 24, the speed limiter 14 and the tether line spool 22 are all coaxial in position and rotate in unison. For example, the coil and torque output drum 24, the speed limiter 14 and the tether line spool 22 may be connected to a single axle. Alternatively, they could be connected to different rotating axles that are physically joined together by gearing systems. In this embodiment, there is no need for a gearing system since the elements are coaxial and no gear reduction is needed between the elements. As the tether line 15 is pulled from the tether line spool 22, the tether line rotates the spool 22, which in turn rotates the coil and torque output drum 24 and the speed limiter 14. As the tether line is pulled from the retriever device 10, the coil portion of the coil and torque output drum 24 grows in size, and the spring 26 shrinks in size because the spring 26 is being transferred to the torque output drum 24. When the tether line 15 is being retracted onto the tether line spool 22, the force of the spring 26 rotates the tether line spool 22 and is resisted by whatever force is applied to the tether line 15. Plus, the force of the spring 26 receives a nominal resistance by the speed limiter 14 at low rotational speeds, and the resistance torque of speed limiter 14 increases dramatically as the rotational speed of the tether line spool 22 increases.

Figure 6:
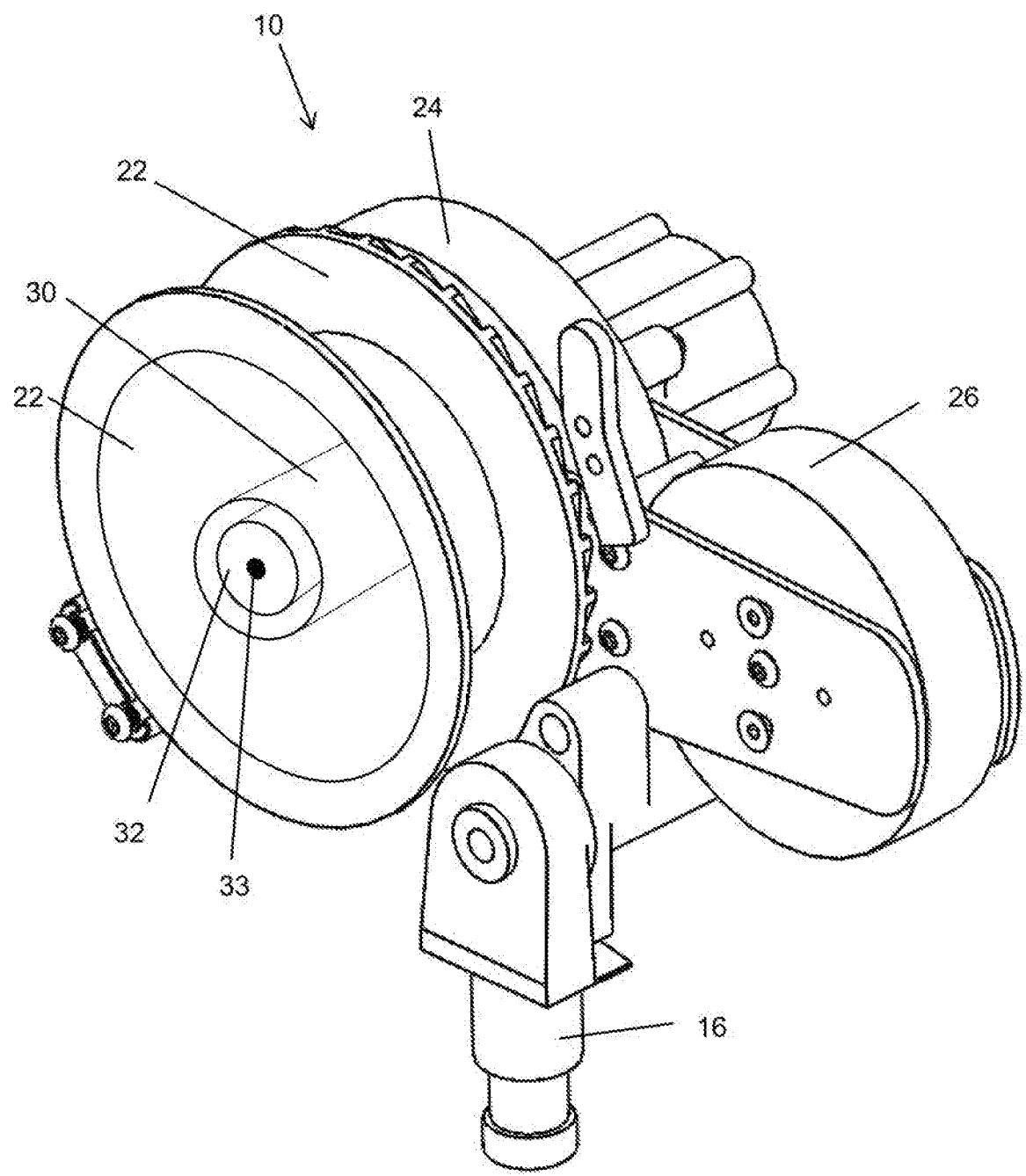
FIG. 6 is a somewhat diagrammatic perspective view of an alternate embodiment of the water vessel retriever device with the cover of the apparatus shown as transparent or removed to illustrate a speed limiter 32 incorporated onto the main axle of the tether line spool.

Referring to FIG. 6, an alternate embodiment of the retriever device 10 is shown. In this embodiment, a speed limiter 32 has been substituted for the speed limiter 14. Thus, the speed limiter 32 is within the case 12 and it is inside the tether line spool 22. The speed limiter 32 is connected to the interior of a spool 30, which is an integral part of the tether line spool 22. Thus, the speed limiter 32 will rotate with the tether line spool 22, but the speed limiter 32 is also anchored to the frame of the retriever device 10. Limiter 32 provides a slight resistance against rotation at low rotational velocities, and it provides a large resistance to rotation at large rotational velocities. In all embodiments, the speed limiters may have fixed characteristics or variable characteristics. In this embodiment, a knob 33 extends through the case 12 and by rotating the knob 33, the speed limiting characteristics may be changed. Thus, the threshold rotational velocity of limiter 32 is changed by rotating the knob 33. If a speed limiter with fixed characteristics is used, the knob is eliminated.

Figure 7:
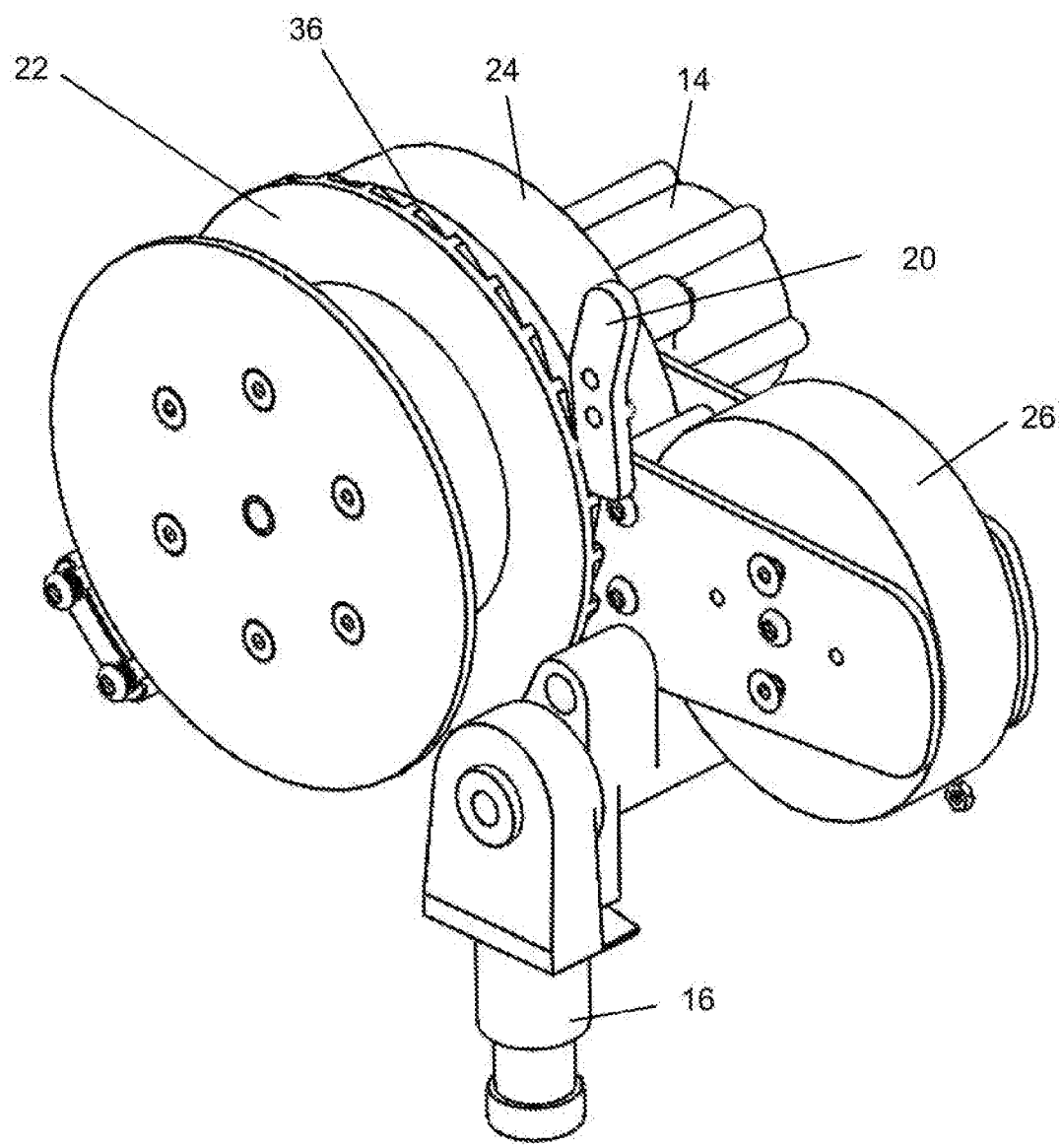
FIG. 7 is a perspective view of the device with the cover completely removed to illustrate the interior components.
Figure 8:
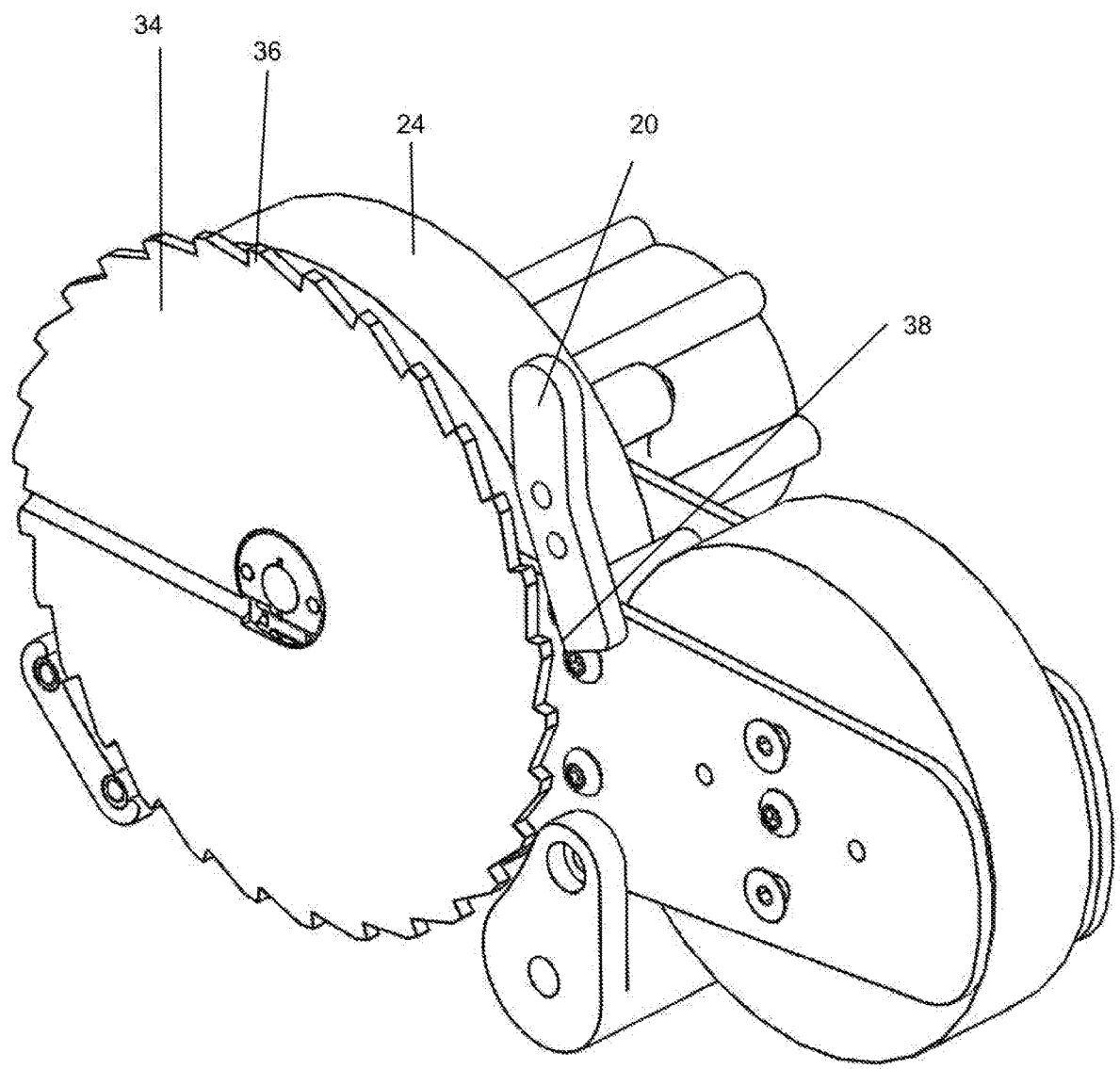
FIG. 8 is a close-up perspective view showing the ratchet lock 20 in an open position.
Figure 9:
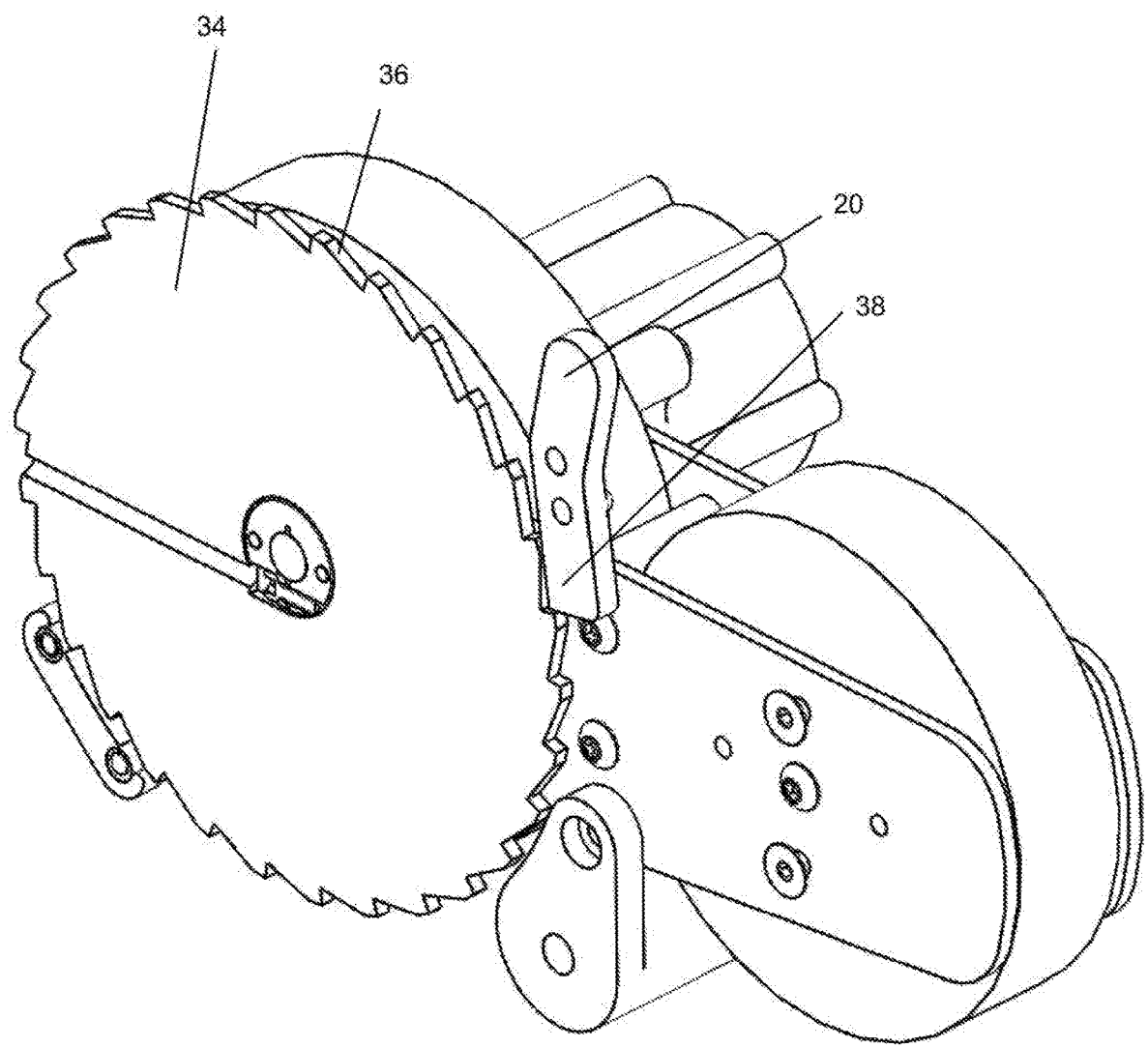
FIG. 9 is a close-up perspective view showing the ratchet lock 20 in a locked position.

FIG. 7 is a view of the retriever device 10 with the case entirely removed to better illustrate the interior structures. In this view, ratchet mechanism teeth 36 are visible and the operation of the ratchet lock 20 is also apparent. FIGS. 8 and 9 show the retriever device 10 with the tether line spool 22 removed to show the details of the ratchet mechanism which includes a ratchet disc 34 with ratchet teeth 36 formed along the perimeter of the disc 34. Also, details of the ratchet lock 20 may be seen. The ratchet lock 20 includes an engagement corner 38 that is spring biased toward the ratchet teeth 36 and will normally engage the ratchet teeth 36 as shown in FIG. 9, thereby preventing the retriever device 10 from pulling the tether line onto the spool 22. However, when the ratchet lock 20 is actuated by the user pushing it into the position shown in FIG. 8, the engagement corner 38 is disengaged from the ratchet teeth 36 and will allow the tether line to be retrieved onto or pulled out of the tether line spool 22 without interference from the ratchet mechanism. In this disengaged position, the ratchet lock 20 includes a lock, preferably a friction style lock that will hold the ratchet lock 20 in an open position until the user forces the trigger back into an engaged position as shown in FIG. 9.

Figures 10A, 10B:
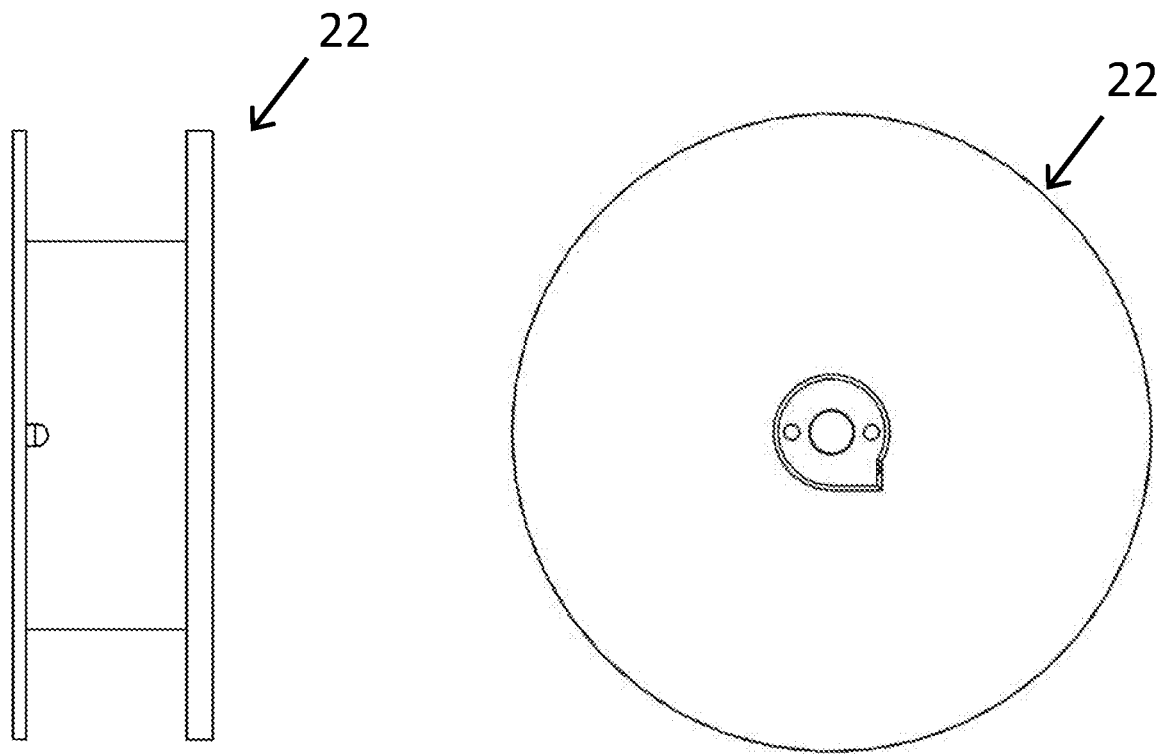
FIGS. 10A, 10B and 10C are different views of the tether line spool shown removed from the housing.
Figure 10C:
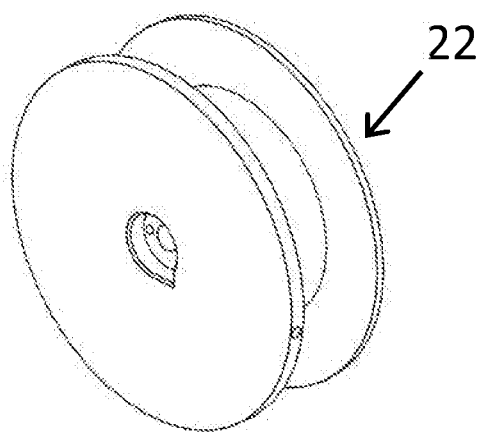

FIGS. 10A-10C show the details of one tether line spool 22 that may be used. The spool 22 has a reel volume of approximately 35 cubic inches, which is considered optimum for water vessel retrieval with a ⅛ inch tether line diameter constructed of Ultra-High Molecular Weight Polyethylene having a minimum break strength of 1,500 to 2,000 pounds. With a tether line having those characteristics, the spool 22 will hold approximately 75-80 feet of tether line which is considered ideal for water vessel retrieval applications. One key to a usable and practical water vessel retriever is maintaining a compact size and yet having sufficient tether line to easily launch a variety of water vessel sizes. For example, in the case of a water vessel class from 14 to 26 feet in length, the ideal volume of the tether line spool is within the range of 30 cubic inches to 40 cubic inches. This volume will accommodate a tether line having a tensile strength of 1500-2000 pounds constructed of Ultra-High Molecular Weight Polyethylene having a length of 75 feet to 100 feet. Of course, the parameters of the tether line strength and material can also vary. The tensile strength of the tether line is greater than 750 pounds for a water vessel class of less than 10 feet in length and is greater than 1000 pounds for a water vessel class of greater than 10 feet in length, but the ideal strength is 1500-2000 pounds.

While numerous and different types of speed limiters may be used in the retrieval device 10, one suitable speed limiter is a Kinetrol Ltd. model S-CRD Dashpot having a viscosity of 12,500 cSl. This speed limiter employs a viscous damper system that allows relatively free movement at slow speed, but rapidly increases resistance to rotation as the speed increases. For example, at speeds between 0.01 and 0.1 rad per second, this speed limiter has a resistance torque of approximately 0.1 pounds inch. However, at a speed of 10 rad per second the limiter provides a resistance torque of approximately 10 pounds inch. In the variable or adjustable version of this speed limiter, the resistance torque may be adjusted between 2 and 10 pounds inch of torque at a speed of 4 radians per second. In the preferred embodiment, for constant torque springs ranging between 2 and 15 pounds inch, the speed limiter should have a resistance torque ranging between 2 and 12 pounds inch at a speed of 3.6 radians per second. In other words, if a speed limiter is chosen with fixed characteristics, those fixed characteristics should include a resistance torque ranging between 2 and 12 pounds inch and a speed of 3.6 radians per second. If a variable speed limiter is chosen, the variable characteristics should include a resistance torque that always remains between 2 and 12 pounds inch at a speed of approximately 4 radians per second regardless of the adjustments that are available on the variable speed limiter. While the ranges discussed above are considered ideal and offer significant advantages, it will be understood that these embodiments are not intended to limit the scope of the invention. Rather, the scope of the invention as defined by the appended claims and the ranges recited in the specifications should be regarded as examples and preferred embodiments, but not limitations.

Figure 11:
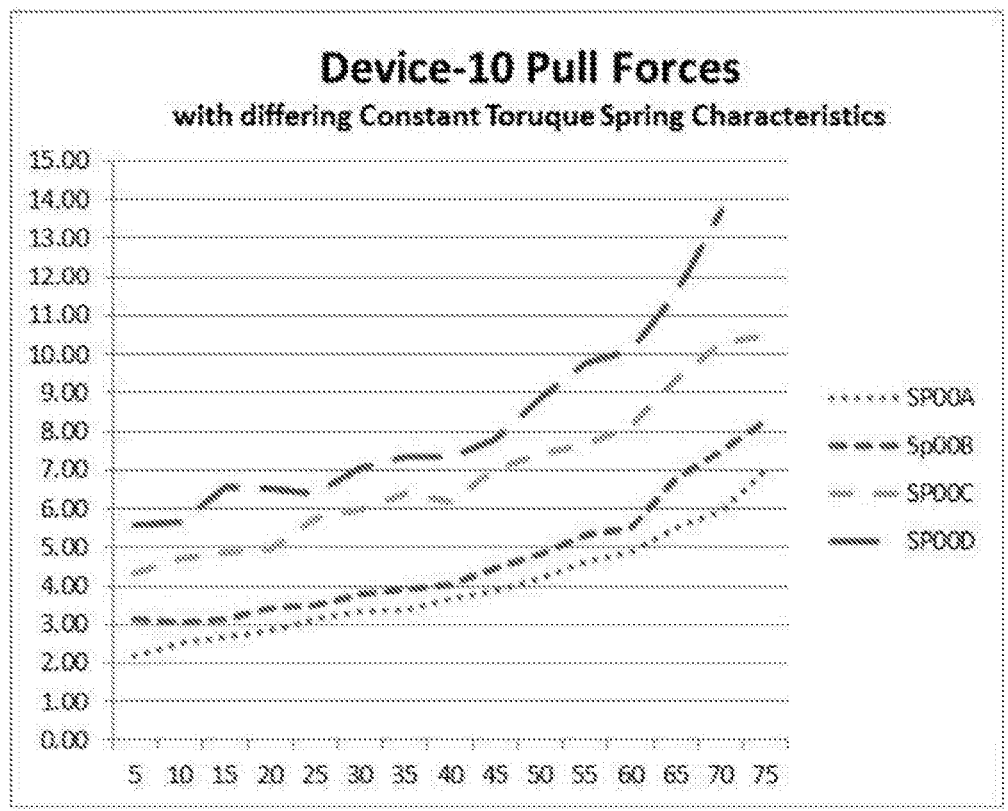
FIG. 11 illustrates four graphs showing performance characteristics (tether line force in pounds versus length of tether line extracted in feet) for four different embodiments of the retriever device.

Referring now to FIG. 11 four line graphs are shown illustrating four different embodiments of the retriever device 10. In each graph the force on the tether line 15 as applied by the retriever device 10 is shown on the vertical axis and the length of the tether line extracted from the retriever device 10 is shown on the horizontal axis. In FIG. 11 the line graph for series SPOOA illustrates the characteristics for a relatively small retriever device 10 suitable for smaller water vessel classes such as canoes, jet skis, small skiffs, or paddle boats. When loaded with a tether line constructed of Ultra-High Molecular Weight Polyethylene and having a tensile strength of approximately 1500 pounds and a spring B-motor with characteristics such as SPOOA, retriever device 10 exerts a tether line force of approximately 2.5 pounds when the tether line is first pulled from the retriever device 10 and approximately 5 feet of tether line has been extracted. When the tether line has been extracted 75 feet from the device and is still being pulled from the tether line spool 22, the tension on the tether line is approximately 7 pounds. Thus, it will be appreciated that the force on the tether line grows as the tether line is extracted further from the retriever device 10. This phenomenon is due to the fact that the effective diameter of the retriever spool 22 is reduced as the tether line is extracted from the spool 22, and the spring has been composed and manufactured to create these desired and needed output characteristics.

FIG. 11 also illustrates the performance of a device 10 with all the same line 15 and spool 22 characteristics but with a different spring SPOOB. The SPOOB spring complies with all mounting requirements of casing 12, tether line spool 22, and storage drum 26, etc., but was composed and manufactured with different—but desired and needed—output properties as shown by its respective line graph. Thus the force is larger and grows faster as the tether line is extracted from the device 10 and there is a slight exponential characteristic to the increasing force. That is, when the tether line is extracted 75 feet from the device, the pull force on the tether line is increasing dramatically with variations in length as compared to a situation where 5 to 30 feet of tether line had been extracted. This embodiment would be appropriate for water vessel classes requiring more strength from the device 10 such as those of slightly higher mass and higher above water surface profiles such as 8 to 16 foot j on boats, sail boats, or drift boats. Such water vessels would be subjected to greater wind forces because of their greater height. Thus, an increased force at the outer length of the tether line is useful in overcoming wind force and creating initial movement of the water vessel in the direction of retrieval device.

FIG. 11 also illustrates an embodiment seen using an SPOOC spring. Again, this embodiment uses a spring having stronger dimensional and metallurgical characteristics than the previous SPOOA and SPOOB springs. Thus, the force on the tether line at all lengths is slightly greater with the SPOOC spring than the force achieved by the SPOOA and SPOOB embodiments. Yet, the SPOOC spring meets all the mounting and operations specifications embodied in device 10. This SPOOC embodiment is ideal for water vessel classes with even greater mass and out of water profiles such as aluminum bass boats, 18×6 foot (or greater) jon boats, or 10 to 14 foot ski boats.

Finally, FIG. 11 illustrates an embodiment known with spring SPOOD. Like all the spring B-motor embodiments before it, the SPOOD spring has been engineered, composed, and manufactured with higher output forces than the predecessor springs yet, still meets the device 10 mounting and operational specifications. As can be seen in this embodiment, the force on the line is consistently greater than the force applied by the other spring B-motors at all line extraction distances. Again, a slightly exponential growth in line force occurs as the line is extracted from the device. This embodiment would be ideal for water vessel classes that have even higher mass and higher out of water profiles such as 20 foot (or greater) fiberglass bass boats, pontoon boats, 20 foot (or greater) ski boats, 18 foot (or greater) sailboats. Such water vessels would be subjected to greater wind forces because of their greater height. Thus, again, an increased force at the outer length of the line is useful in overcoming wind force and creating initial movement and momentum of the water vessel in the direction of retrieval device.

Referring again to FIGS. 1-5 and 23 the spring B-motor 24 may also represent a battery 90 powered, electronically controlled 92, electronically powered 24 electric motor 24 that is pre-programmed to retrieve the line 15 with desired characteristics. For example, the motor 24 may be programmed to provide constant torque or to provide any of the torque curves shown in FIG. 11 and it may be powered electronically with high frequency pulses to provide a highly efficient highly controllable motor. The electric motor 24 may be used in combination with the limiter 66 described below (FIGS. 18-22). Alternatively, the electric motor 24 may be programmed by power supply/controller 92 (FIG. 23) to be self-limited to provide a desired torque curve subject to a speed limit or other limits. In one embodiment, the electric motor may be programmed to monitor and measure using a sensor 94 (FIG. 23) its own motion (acceleration, velocity and/or distance (revolutions)) and to measure the current (or power) applied to the motor, and based on the measured parameters calculate the tension on the tether line 15. In general, rapid acceleration of the motor 24 under steady electrical power would indicate that the tension on the line 15 dropped to near zero, indicating that the user dropped the line.

Using this indirect measure of such tension, the electric motor may be programmed to stop retrieval of the tether line 15 when tension on the line drops below a predetermined amount. In this embodiment, a user may drop the line 15 and the electric motor will almost immediately stop retrieving. When the user picks up the line 15 and pulls it, the motor senses that motion and restart retrieval. The motor may also be programmed to turn off after a set time (eg. 5 minutes) of no movement of the line 15 and to turn on and retrieve the line 15 if the line is pulled from the retriever 10. Thus, the characteristics of a spring B-motor may be emulated by an electrical motor or a more complicated and varied retrieval program may be implemented if desired.

From the above discussion, it will be appreciated that a wide variety of motors and speed limiter's may be used in various embodiments of the invention. However, in general, the constant motor should have characteristics ranging between 2 to 15 pounds pull force and the speed limiter should have tether line retraction characteristics ranging between 4 to 10 feet per second. For embodiments designed for smaller water vessel classes, the motor characteristics and the speed limiter characteristics may be chosen from the lower end of those ranges. For larger water vessel classes in both weight and out of water profile (height), the motor and speed limiter should have characteristics chosen from the higher end of those ranges.

The method of launching a water vessel using the device 10 begins by mounting the device into a pivotal rotary receiver mount that may be attached to any place on the water vessel, or it may be mounted in a rotary receiver mount on a dock or other stationary structure on, or off, shore. Assuming the device 10 is mounted on the water vessel, the end of the tether line is extracted from the device and attached to the dock or other anchor point. In this embodiment, the ratchet lock is disengaged so that it will allow the tether line 15 to move freely into or out of the retriever device 10. The water vessel on the trailer is then backed into the water and released from the trailer. The initial attachment of the tether line to the dock or on shore anchor point causes an initial winding of the spring. Then, as the trailer is backed into the water rewinding of the spring may occur and the device 10 will keep the tether line 15 taught. Also, the movement and momentum of the water vessel from the trailer into the water will cause additional extraction of tether line and winding of the spring or the device may pull in slack. With the water vessel is fully released from the trailer and floating on the water, and the spring B-motor retaining the energy resulting from the mass and momentum of the moving water vessel, the device 10 begins to immediately pull the water vessel toward its anchor point on, or off, shore while simultaneously the trailer is pulled from the water. As the operator is parking his vehicle and trailer, the water vessel is being gently pulled toward the docking point or shore. When the operator returns, the water vessel will have been gently pulled toward or completely to the docking point or shore—in a controlled fashion. If the retriever device 10 is mounted on a dock or an anchor point on shore, the launching procedure described above is essentially the same. Tether line will be extracted from the device as the water vessel is launched, and the retrieval of the tether line will gently pull the water vessel to the dock or shore immediately once the water vessel is launched.

Alternatively, the retriever device 10 may be used to launch a water vessel while using the ratchet lock mechanism. When using the ratchet lock mechanism, the retriever device 10 should be mounted on a dock or anchor point on, or off, shore. The ratchet lock mechanism is engaged and the water vessel is launched as before. The retriever device 10 will extend the tether line as needed as the water vessel is launched, but the ratchet lock mechanism will prevent the retriever device 10 from pulling in slack tether line, if any. Likewise, when the water vessel is fully launched, the ratchet lock mechanism will prevent the water vessel from being pulled to shore or to the dock. When the operator returns, they will trigger the ratchet lock mechanism into the unlocked or open position. The device 10 will then pull the water vessel to the docking point or to shore in a controlled fashion The retriever device 10 may also be used to facilitate loading of a water vessel onto a trailer. For example, the retriever device 10 is mounted in the pivotal rotary receiver mount in the bow of the water vessel. The water vessel is then tied to the dock or to shore by a separate tether line or other connector, and the tether line from the device 10 is pulled out and attached to the trailer, preferably the forward end of the trailer. As the trailer is back into the water, the tether line may be further pulled from the retriever device 10, or the tether line may be retrieved, depending upon whether the movement of the trailer increases or decreases the distance to the water vessel. Once the trailer is in position on a launching ramp to receive the water vessel, the operator then releases the water vessel from the dock or shore and maneuvers the water vessel onto the trailer. The force from the tether line on the retriever device 10 is constantly urging the bow of the water vessel toward the forward end of the trailer which facilitates the process of locating the water vessel properly on the trailer.

For example, if the operator chooses to use the water vessel motor and drive the water vessel onto the trailer, the pull of the tether line from the retriever device 10 will help guide the water vessel properly onto the trailer. Once the user has the water vessel properly aligned using the water vessel's motor, the motor may be turned off and the retriever device 10 will continue to pull the water vessel into proper position on the trailer.

Figure 12:
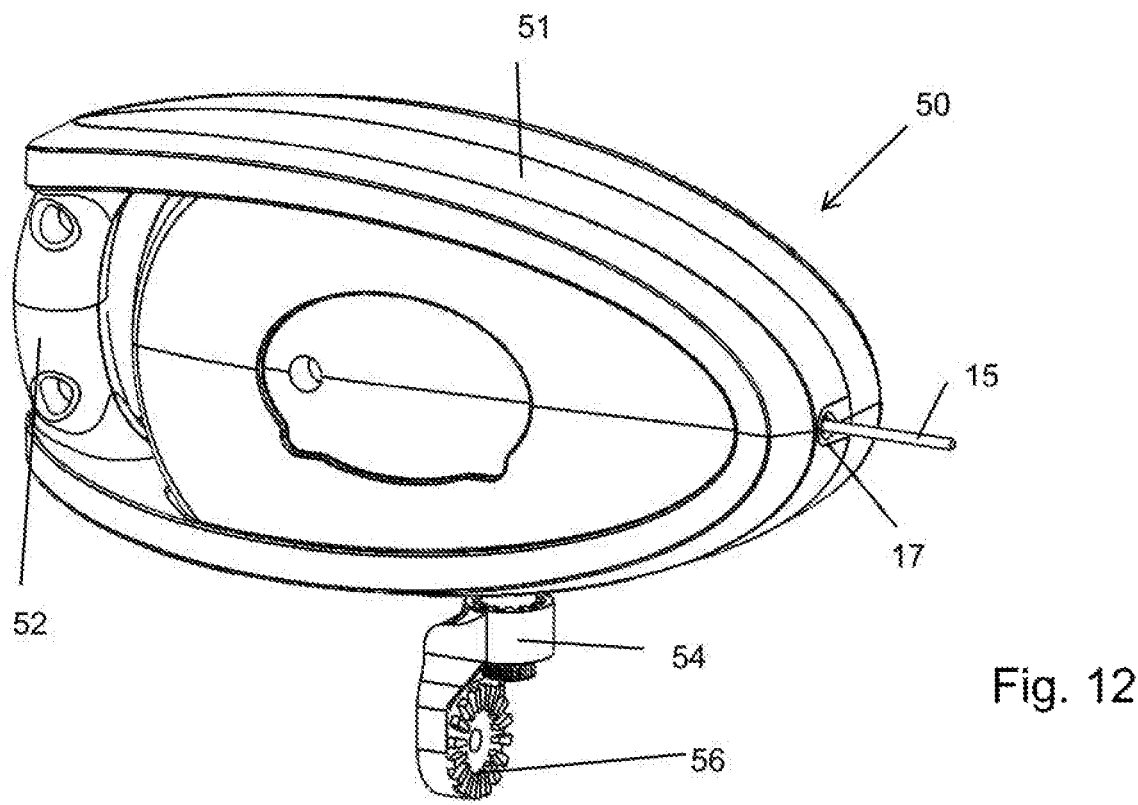
FIGS. 12 and 13 are right side perspective views of alternative embodiments showing different rotary (pivoting) mounts on the retriever.
Figure 13:
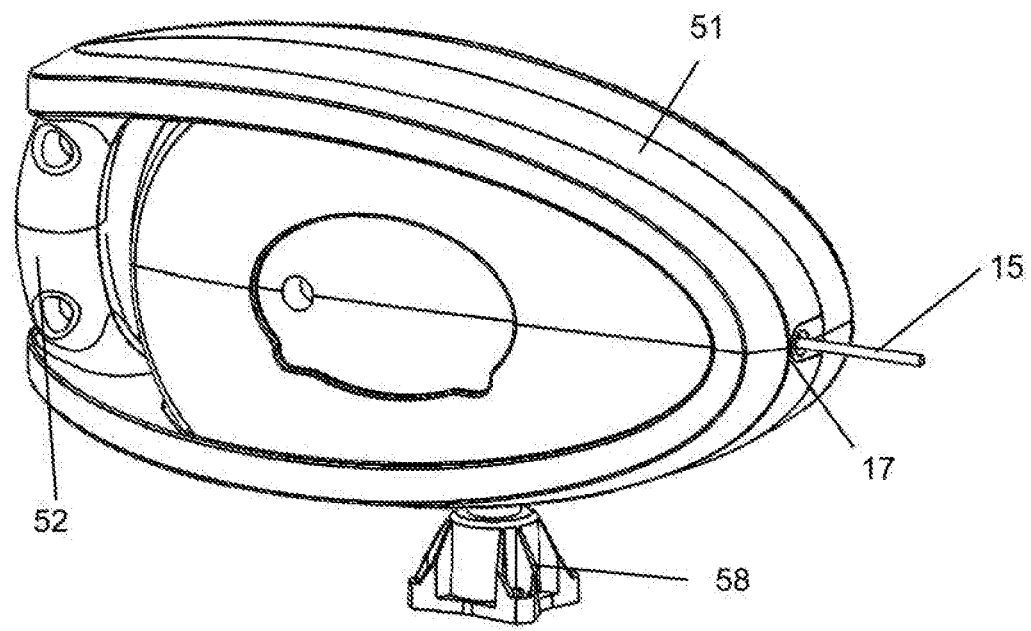
Figure 14:
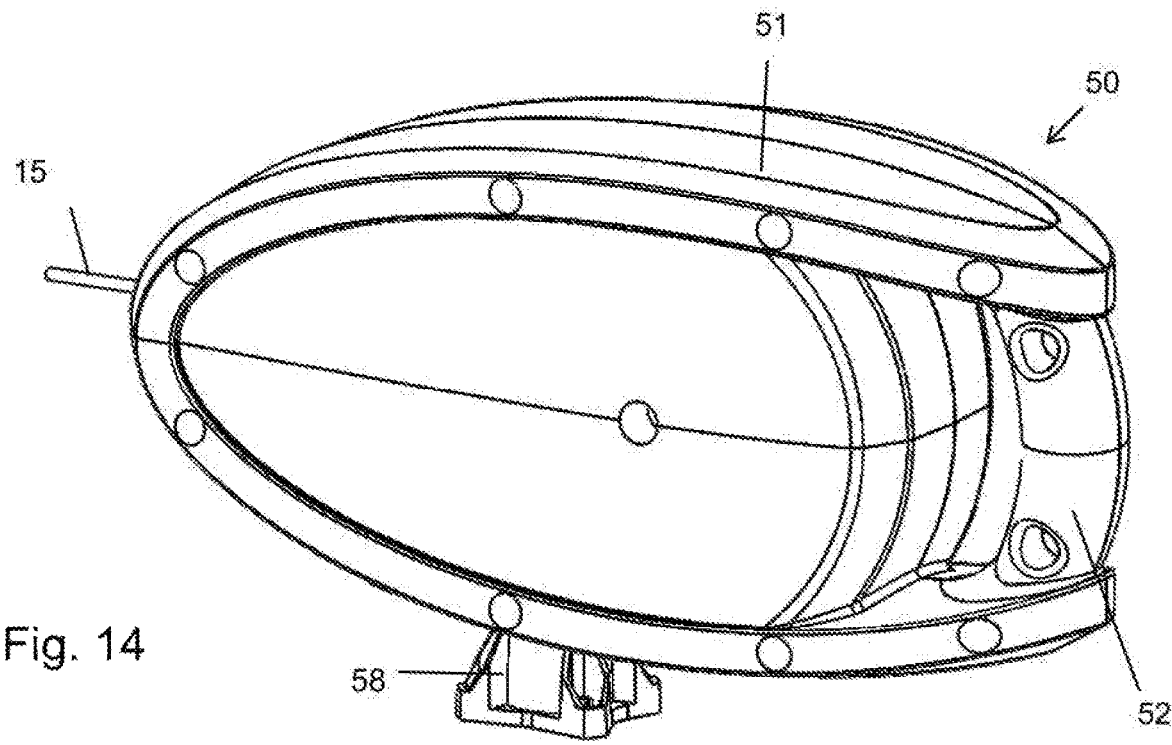
FIG. 14 is a left perspective view of the retriever.

An alternate embodiment is shown in FIGS. 12, 13 and 14. In this embodiment, the retriever 50 includes an external case 51 with a handle 52 built into the rear of the case 51 opposite from the front of the case 50 where the tether line 15 exits the case 50 through the tether line guide 17. A rotary mount 54 is provided on the bottom of the case 51 and is oriented to allow the case 51 to rotate and pivot on a vertical axis. In this particular embodiment, the rotary mount includes a horizontal adjustment face 56 that is configured for being attached to a corresponding mating face such that the mount 54 can be positioned at an angle with respect to the horizontal axis of the adjustment face 56. Thus, the adjustment face 56 may be used to fix the mount 54 in a vertical orientation or, if desired, the mount 54 may be rotated about the horizontal axis of the face 56 such that the mount 54 is in line with respect to absolute vertical. FIG. 13 shows an alternate rotational mount 58 attached to the bottom of the case 51. In this particular embodiment the mount 58 can be permanently or fixedly mounted on an object, such as a dock or a boat, and it allows rotational movement of the case 51, but there is no mechanism for adjusting the position of the case 51 around a horizontal axis. This particular embodiment also allows for a ball and joint mechanism to be attached to this mount, thus this embodiment would allow for adjustments to be made along the horizontal axis with respect to absolute vertical. FIG. 14 shows the retriever 50 rotated approximately 180° with respect to the position shown in FIG. 13 illustrating how the case 51 can rotate around the mount 58.

Figure 15:
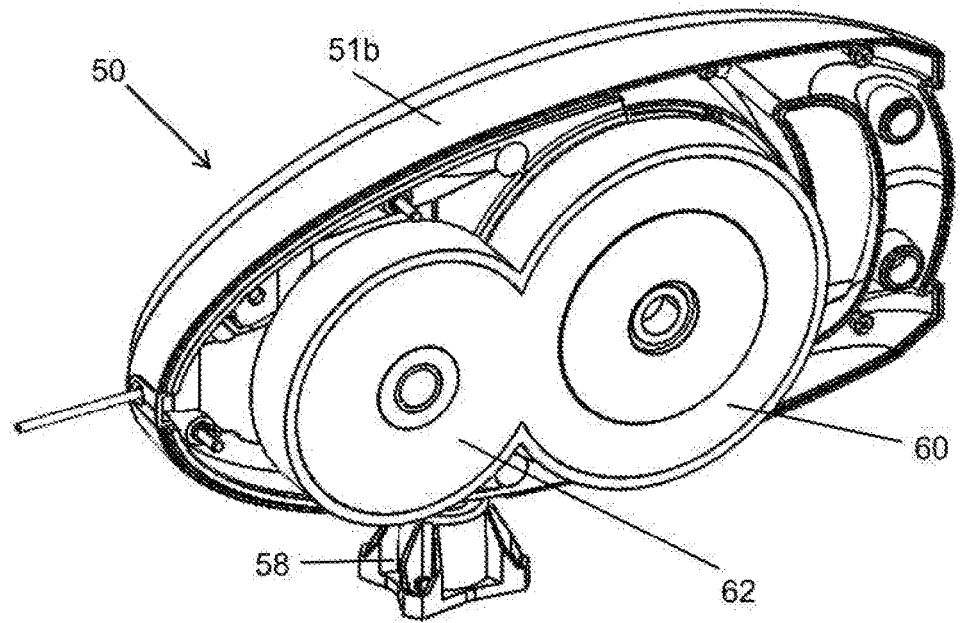
FIG. 15 is a left perspective view of the retriever with the left half of the case removed.

FIG. 15 illustrates the retriever 50 with half of the case 51 removed leaving only the right half 51b of the case 51. In this view, the drums 60 and 62 of the spring B-motor are illustrated. When the tether line 15 is pulled from the retriever 50, the drum 60 rotates and pulls the spring B-motor from the storage drum 62. When the tether line 15 is attached to a movable object, such as a floating water vessel, the spring B-motor will drive the drum 60 to retrieve the tether line 15 and pull the water vessel toward the retriever 50. So, for example, the retriever 50 may be mounted on a dock and the tether line 15 may be attached to a floating water vessel. As the water vessel is launched from a trailer, it will immediately pull the tether line 15 from the retriever 50. After the water vessel is floating freely, the retriever 50 will pull the water vessel toward the dock in a self-governing and controlled fashion.

Figure 16:
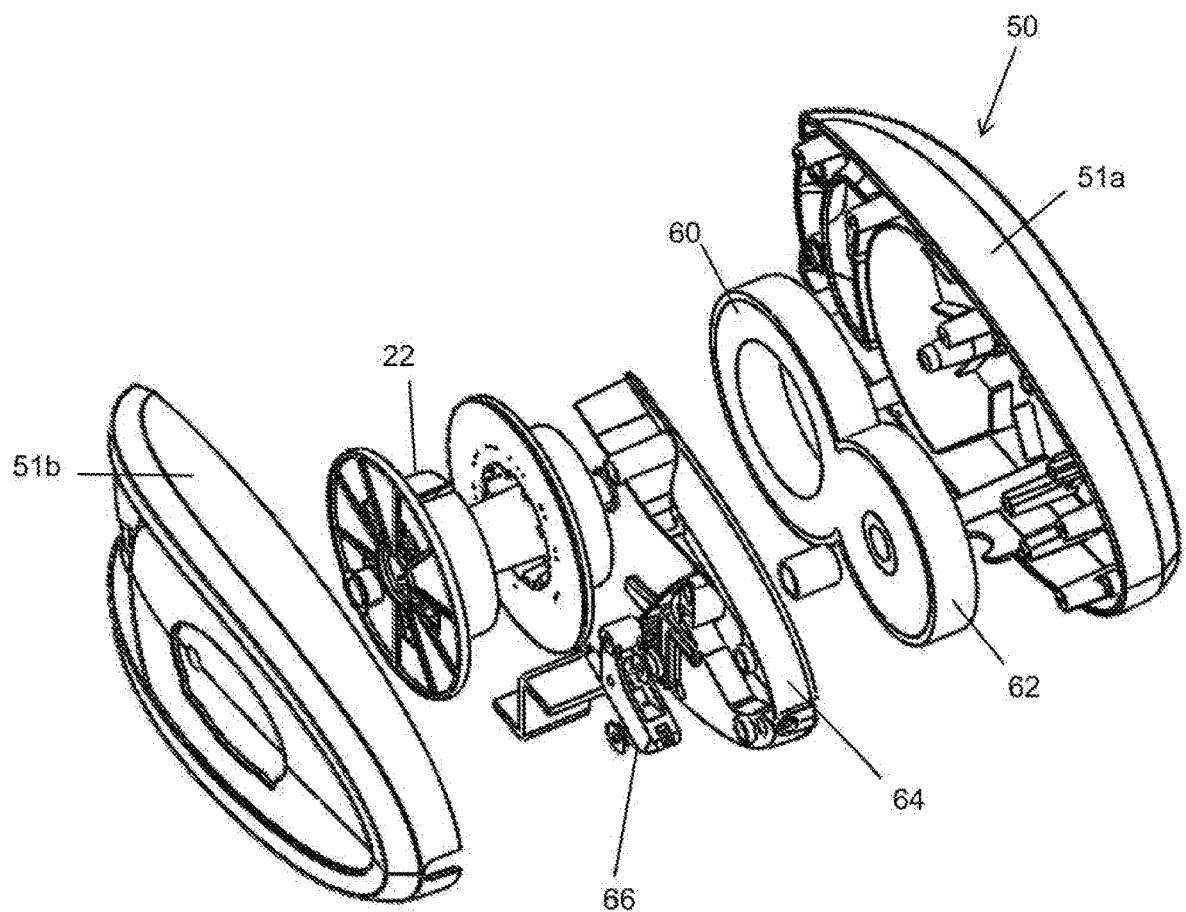
FIG. 16 is an exploded view of the retriever.
Figure 17:
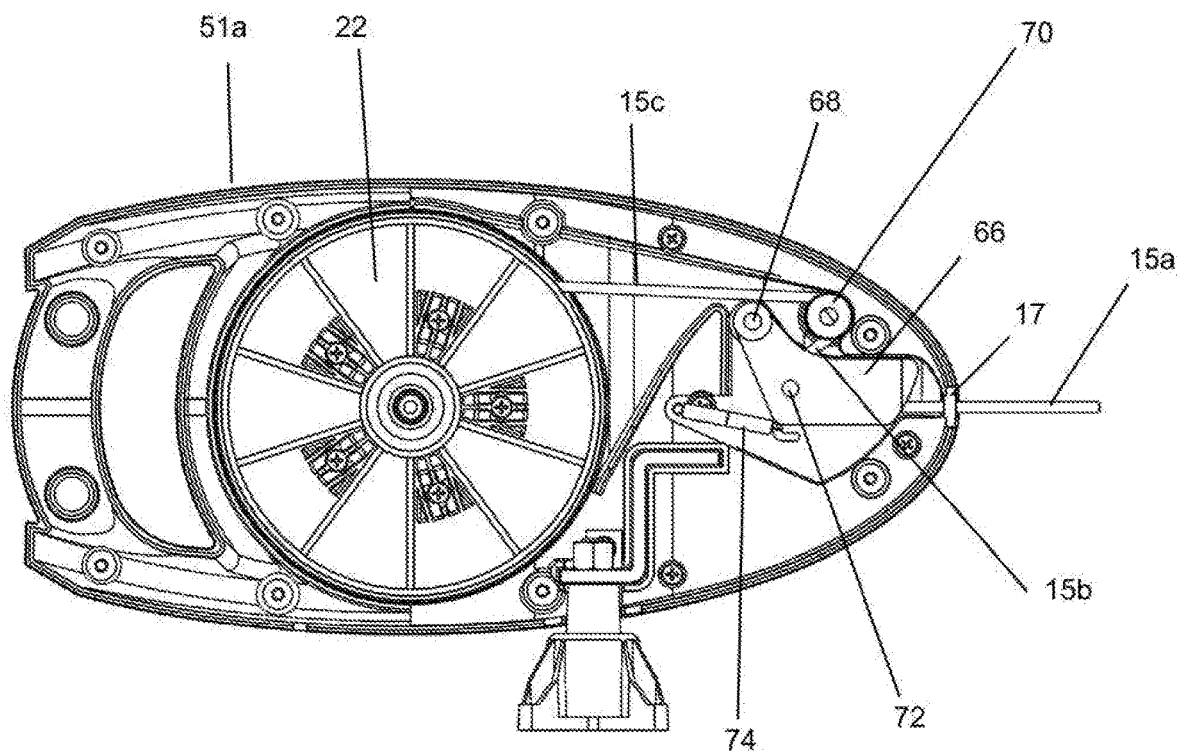

In FIG. 16, an exploded view of the retriever 50 is shown. The retriever case 51 is formed by two half cases 51a and 51b, and inside the case is mounted the B-motor drums 60 and 62 along with a spring B-motor and spool 22 for holding the tether line, a frame 64 and a limiter 66. The operations of these components may best be understood by reference to FIGS. 17 and 18, which show cross-sections or side views of the retriever 50 in two different operating conditions. The tether line 15 enters the retriever through tether line guide 17 and passes into the limiter 66. The tether line 15 is then fed around a roller 76 (FIG. 19) that is mounted on a pin 72 (FIG. 18), and then the tether line is fed around roller 70 and then back to the spool 22. In FIG. 17, tension is being applied to the tether line 15 and thus tether line sections 15a, 15b and 15c are all in tension, and this tension is applied to the limiter 66 to hold the limiter 66 in the position shown in FIG. 17. The tension on tether line 15 will be present when the tether line 15 is being pulled from the retriever or when the retriever is pulling the tether line back into the case 51 against resistance. For example, if the retriever 50 is pulling a water vessel back towards the dock, the spring B-motor force will apply continuous tension to the tether line 15 and maintain the position of the limiter 66 as shown in FIG. 17.

Figure 18:
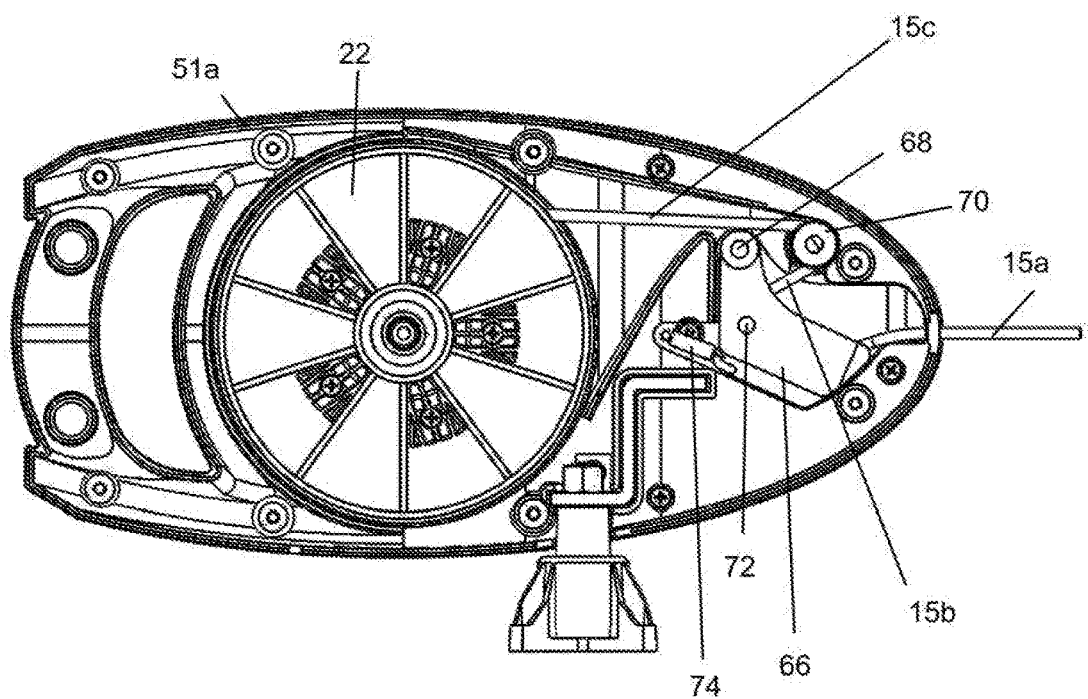
FIGS. 17 and 18 are cross-sectional views of the retriever showing a stop mechanism in two different positions.

However, when tension is released from tether line section 15a (i.e. tension on the tether line 15 approaches zero), a spring 74 pulls the limiter 66 into the position shown in FIG. 18. In this position, a plurality of teeth 78 (FIGS. 20, 21 and 22) formed in the limiter 66 engage the tether line 15 and stop the tether line's movement into the case 51 and onto the spool 22. For example, if the tether line 15 is being pulled from the retriever 50, but the tether line is accidentally dropped, the tension on tether line 15 will be released and the spring B-motor will attempt to retrieve the tether line 15 rapidly. However, the lack of tension on the tether line section 15a is overcome and will allow the spring 74 to pull the limiter 66 into the position shown in FIG. 19. In that position, the teeth 78 will engage the tether line 15 and stop the tether line 15 from being further retrieved into the case 51. As soon as the tether line 15 is engaged by the teeth 78, tension will return to tether line sections 15b and 15c, but not 15a. Thus, the tension on tether line section 15b will pull the limiter 66 back into the position shown in FIG. 17. However, the tether line section 15a will look differently from that shown in FIG. 17. The tether line 15 will still be engaged by the teeth until tension is reapplied to the tether line 15a. When tension is reapplied to tether line 15a, the teeth 78 will release the tether line 15a, and the retriever will again be in condition to retrieve the tether line 15 and pull an object toward the retriever. Thus, the retriever 50 is in condition to pull a floating water vessel toward a dock, for example.

Figure 19:
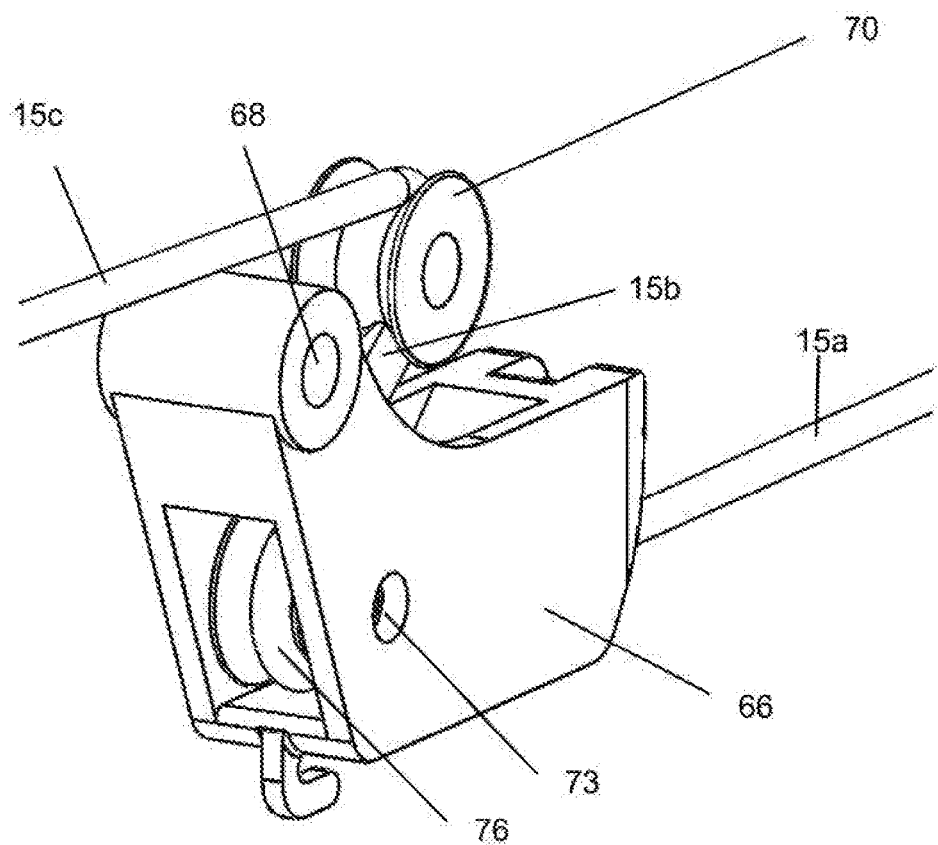
FIGS. 19-22 are four different views of the stop mechanism.
Figure 20:
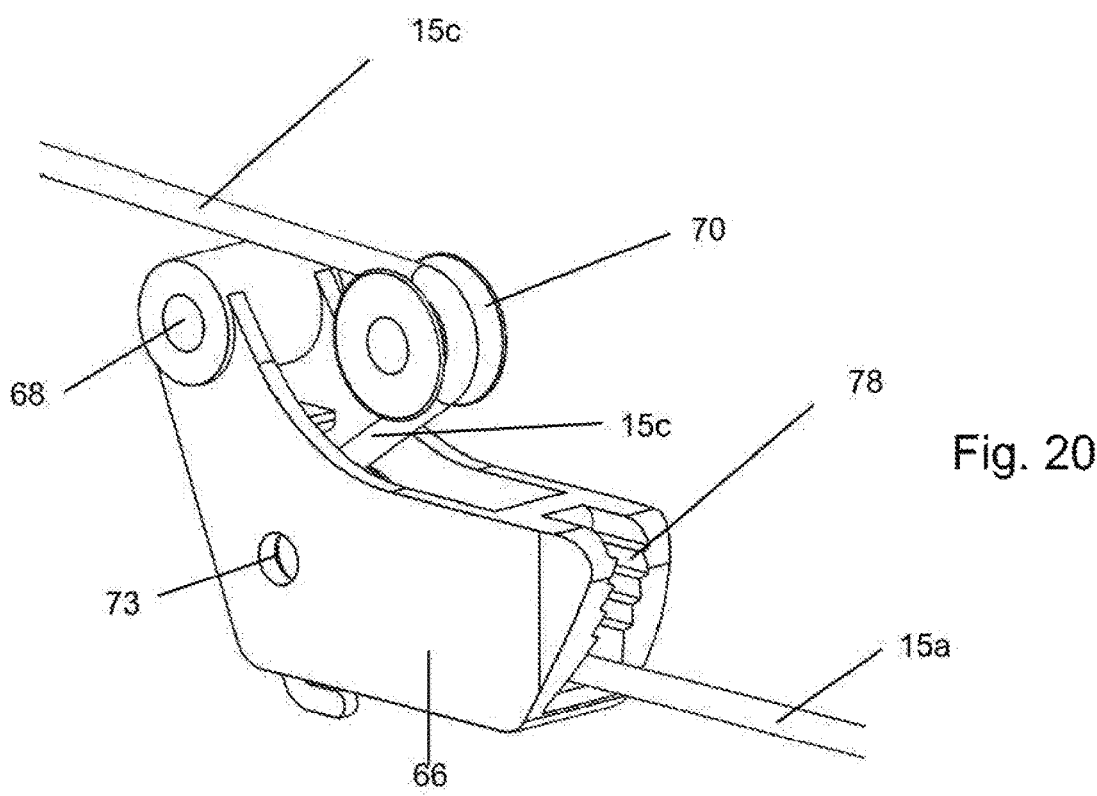
Figure 21:
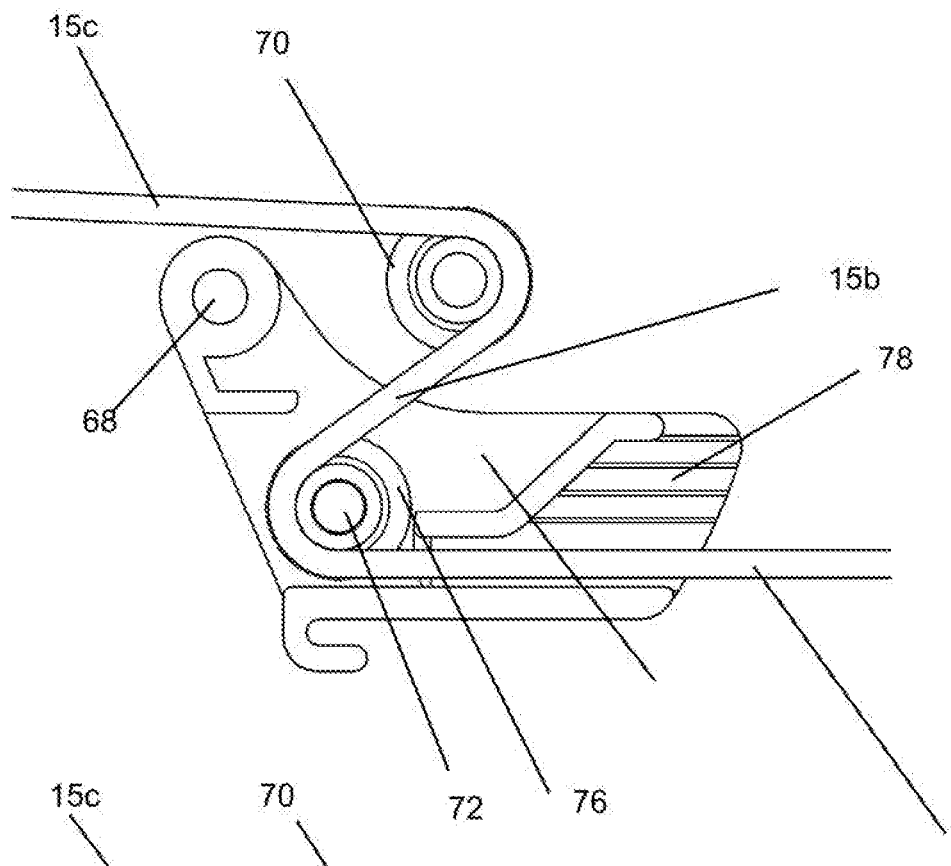
Figure 22:
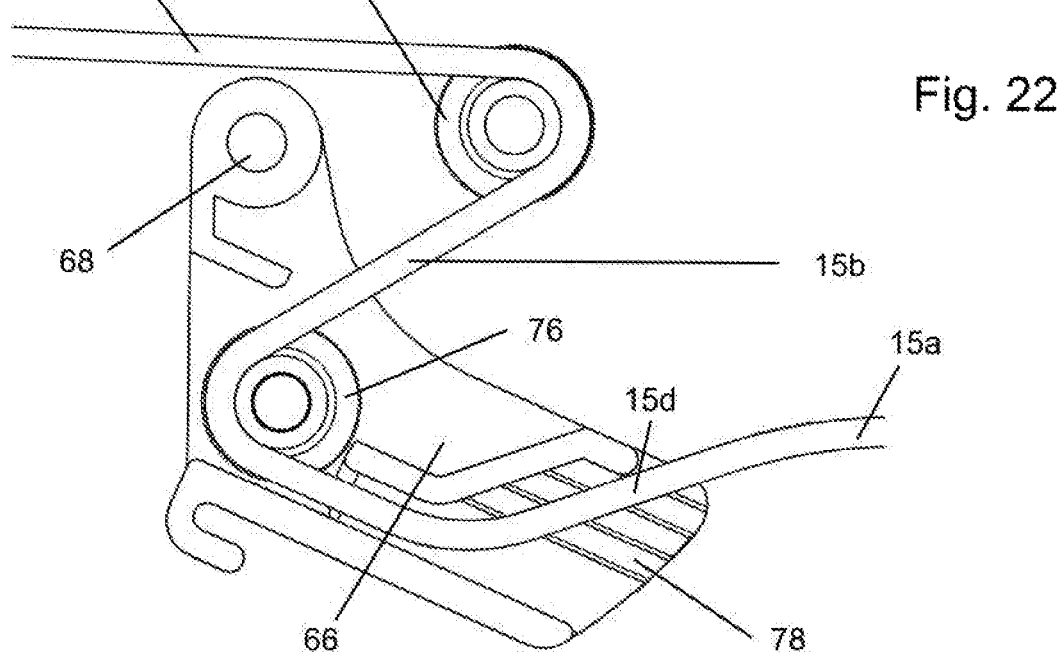
Figure 23:
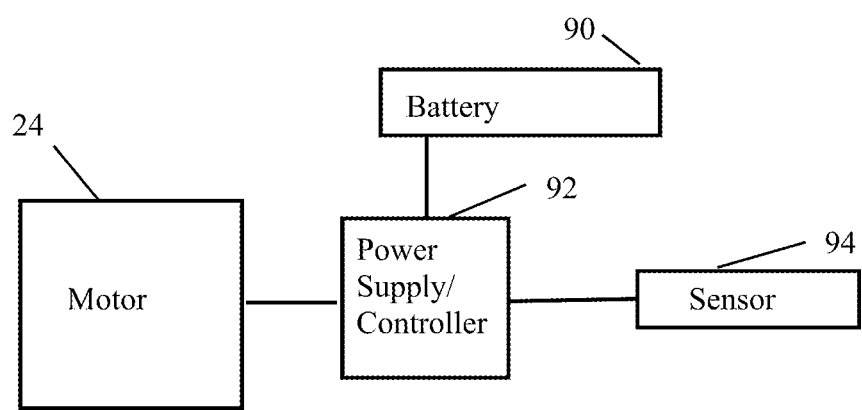
FIG. 23 is a simple block diagram of an electric motor and related components.

Referring to FIGS. 19-22 the operation of the limiter 66 may be best understood. In FIGS. 19-21, the limiter 66 is shown in a position with tension on all sections 15a, 15b and 15c of the line 15. The tension on the line sections 15a and 15b will attempt to rotate the limiter 66 in an upward direction around the pivotal mount 68. However, when tension is released on the line section 15a, tension will also be released on line sections 15b and 15c. With the line tension is released, the spring 74 (shown in FIGS. 17 and 18) will pull the limiter 66 into the position shown in FIGS. 17 and 22. The force of spring 74 is oriented in a direction to rotate the limiter 66 downwardly around the pivotal mount 68. In that position, which is shown in FIG. 22, the line section 15d is engaged by the teeth 78 and the teeth 78 will stop the line 15 from being further moved by the spring B-motor into the retriever 50. With the teeth 78 gripping the line 15, the spring B-motor will apply tension to the line 15 and the forces on line sections 15c and 15b yet, the line section 15d will remain captured in the teeth. If a user applies tension to the line 15a while it is being grasped by the teeth 78, the line 15 will be pulled from the teeth 78 and the retriever 50 will again be operational.

In operation, a user will begin pulling the tether line 15 from the retriever 50. After the user has pulled a section of the tether line from the retriever 50, the user may wish to release the tether line 15 to do something else. By simply releasing the tether line 15, the user will allow the limiter 66 to grip the tether line 15 and stop the retriever 50 from retracting tether line 15. When the tether line 15 is released, the limiter 66 will stop the retrieval of the tether line 15 after it is retrieved for about one additional inch, and it will be stopped before the line falls downwardly about 6 inches. These distances will vary depending on many factors, but these approximate dimensions illustrate that the reaction time of the limiter 66 appears to be almost instantaneous after the line is released and thus the reaction time is on the order of a two tenths of a second, or much less than one second. When the user is ready to attach the tether line 15 to a floating vessel and allow the vessel to be pulled by the retriever 50 toward a dock, the user simply attaches the tether line 15 to the vessel while maintaining a slight amount of tension on the tether line 15. Then, when the tether line 15 is released, the tension is maintained on the tether line 15 by the water vessel being retrieved toward the dock by the spring B-motor. So long as the spring B-motor maintains tension on the tether line 15, the retrieval process will continue. To temporarily stop retrieval, the user could simply grasp the tether line, pull it quickly out of the retriever and then release the tether line. The tension on the tether line will be gone momentarily and the teeth 78 will engage the tether line 15 and will stop further retrieval until tension is reapplied to the tether line 15.

Thus, it will be appreciated that the limiter 66 of the retriever 50 provides both a safety function and a convenience function. From a safety point of view, it will stop rapid retrieval of the tether line 15. From a convenience point of view, the retrieval process may be controlled by the user by simply pulling on the tether line 15 and rapidly releasing it or by pulling on the tether line 15 and gently releasing. The rapid release will cause the limiter to "detect" zero tension on line 15 to engage and stop retrieval. A gentle tug or pull will restore tension back on the line 15 and will cause the limiter 66 to allow retrieval of line 15.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A retriever device for applying a tension to a tether line comprising:
   a) a structural unit;
   b) a tether line extending from the structural unit;
   c) a spool mounted for rotation on the structural unit and dimensioned to hold the tether line;
   d) a motor mounted on the structural unit and connected to the spool for allowing removal of the tether line from the spool and for providing a force to wind the spool and retrieve the tether line onto the spool, wherein the motor comprises a spring motor having a ribbon-shaped spring that is disposed on at least a first and second drums; and
   e) a control mechanism that senses at least one operating parameter of the retriever device corresponding to the tension on the tether line and responds to the operating parameter: (1) to engage a stop mechanism to stop the retrieval of the motor when tension on the tether line is below a predetermined tension, and (2) to disengage the stop mechanism to allow the motor to retrieve the tether line when the tension on the tether line is above a predetermined tension.

2. The retriever device of claim 1 wherein the control mechanism comprises a self-governing engagement mechanism that comprises:
   a) the stop mechanism being movably mounted on the structural unit adjacent the tether line;
   b) engagement structure formed on the stop mechanism configured to engage and stop the movement of the tether line in a retrieval direction;
   c) a force applicator mounted on the structural unit and disposed to urge the engagement structure toward the tether line,
   d) a lift structure disposed on the stop mechanism for lifting the engagement structure in a direction away from the tether line, the engagement structure and force applicator being configured so that (1) the engagement structure is lifted away from the tether line when the tension on the tether line is above a predetermined amount and (2) the engagement structure is urged to engage the tether line and stop retrieval of the tether line when tension on the tether line is below a predetermined amount.

3. The retriever device of claim 1 wherein the control mechanism comprises a self-governing engagement mechanism that comprises:
   a) a cleat mechanism that is movably mounted on the structural unit adjacent the tether line;
   b) teeth formed on the cleat mechanism configured to engage and stop the movement of the tether line in a retrieval direction;
   c) a spring mounted on the structural unit and disposed to urge the teeth toward the tether line,
   d) a lift structure disposed on the cleat mechanism for lifting the teeth in a direction away from the tether line, the lift structure and spring being configured so that (1) the teeth are lifted position that does not stop retrieval of the tether line when the tension on the tether line is above a predetermined amount and (2) the teeth are urged to engage the tether line and stop retrieval of the tether line when tension on the tether line is below a predetermined amount.

4. The retriever device of claim 1 wherein the control mechanism further comprises a speed control mechanism that applies a force to the spool and reduces the speed of the spool when the motor force is retrieving the tether line onto the spool.

5. The retriever device of claim 4 wherein the control mechanism is configured to apply a force that is proportional to the rotational speed of the spool so that an increasing braking force is applied to the spool as the rotational speed of the spool increases.

6. The retriever device of claim 1 wherein the control mechanism comprises a viscous damper applying a drag force to the spool and reducing the speed of the spool when the motor force is retrieving the tether line onto the spool.

7. The retriever device of claim 1 wherein the control mechanism comprises an adjustable damper for applying a drag force to the spool and reducing the speed of the spool when the motor force is retrieving the tether line onto the spool.

8. The retriever device of claim 1 further comprising a pivoting rotary mount for mounting the structural unit to an object and being configured and positioned on the structural unit such that the structural unit may rotate on the rotary mount on an axis of rotation so that tension on the tether line will point the structural unit in the direction of the tether line when the retriever device is mounted to an object.

9. The retriever device of claim 1 wherein the motor is configured to provide a retrieval force on the tether that is proportional to the length of the tether line that has been pulled from the retriever device.

10. A retriever device for applying a tension to a tether line comprising:
    a) a structural unit;
    b) a tether line extending from the structural unit;
    c) a spool mounted for rotation on the structural unit and dimensioned to hold the tether line;
    d) a motor mounted on the structural unit and connected to the spool for allowing removal of the tether line from the spool and for providing a force to wind the spool and retrieve the tether line onto the spool; and
    e) a control mechanism that senses at least one operating parameter of the retriever device corresponding to the tension on the tether line and responds to the operating parameter: (1) to engage a stop mechanism to stop the retrieval of the motor when tension on the tether line is below a predetermined tension, and (2) to disengage the stop mechanism to allow the motor to retrieve the tether line when the tension on the tether line is above a predetermined tension; and f) wherein the motor comprises a spring motor configured to increase retrieval force proportionally with the length of the tether pulled from the retriever device.

11. The retriever device of claim 10 further comprising a supplemental drive input having a socket connected to the spool, the socket being configured to receive a supplemental driver, for rotating the spool and retrieving the tether line onto the spool.

12. The retriever device of claim 10 wherein the structural unit is at least partially transparent to allow observation of the spring and spool.

13. The retriever device of claim 10 further comprising a ratchet mechanism connected to the spool, the ratchet mechanism having:
   a) an engaged mode of operation that allows the spool to rotate in only one direction so that the tether line may be removed from the spool but may not be retrieved onto the spool, and
   b) a disengaged mode of operation that allows rotation of the spool in both directions so that the tether line may be removed from the spool or retrieved onto the spool.

14. The retriever device of claim 10 wherein the spool has a spool volume of between 30 and 40 cubic inches, the tether line is between 25 and 100 feet in length, the tether line is made of an ultra-high molecular weight polyethylene of diameter less than 1/8 inch and has a tensile strength of greater than 750 pounds.

15. A water vessel retriever device for being connected between a water vessel and a stationary object, applying a tension to a tether line and retrieving the water vessel floating in water towards the stationary object after the water vessel is launched from a trailer comprising:
   a) a structural unit;
   b) a tether line extending from the structural unit and having a length and strength dimensioned for launching the water vessel from the trailer and pulling the water vessel toward the stationary object;
   c) a spool mounted for rotation on the structural unit and dimensioned to hold the tether line;
   d) a spring motor on the structural unit and connected to the spool for allowing removal of the tether line from the spool while the water vessel is being launched and for providing a force to wind the spool and retrieve the tether line onto the spool, the spring motor being dimensioned and configured in proportion to the size of the water vessel so that the spring motor will pull the water vessel from a launched position floating in the water towards the stationary object; and
   e) a control mechanism that senses at least one operating parameter of the retriever device corresponding to the tension on the tether line and responds to the operating parameter: (1) to engage a stop mechanism to stop the retrieval of the motor when tension on the tether line is below a predetermined tension, and (2) to disengage the stop mechanism to allow the motor to retrieve the tether line when the tension on the tether line is above a predetermined tension.

16. The retriever device of claim 15 wherein the control mechanism further comprises:
   a) the stop mechanism being movably mounted on the structural unit adjacent the tether line;
   b) engagement structure formed on the stop mechanism configured to engage and stop the movement of the tether line in a retrieval direction;
   c) a force applicator mounted on the structural unit and disposed to urge the engagement structure toward the tether line,
   d) a lift structure disposed on the stop mechanism for lifting the engagement structure in a direction away from the tether line, the engagement structure and force applicator being configured so that (1) the engagement structure is lifted away from the tether line when the tension on the tether line is above a predetermined amount and (2) the engagement structure is urged to engage the tether line and stop retrieval of the tether line when tension on the tether line is below a predetermined amount.

17. The retriever device of claim 15 wherein the control mechanism further comprises:
   a) a cleat mechanism that is movably mounted on the structural unit adjacent the tether line;
   b) teeth formed on the cleat mechanism configured to engage and stop the movement of the tether line in a retrieval direction;
   c) a spring mounted on the structural unit and disposed to urge the teeth toward the tether line,
   d) a lift structure disposed on the cleat mechanism for lifting the teeth in a direction away from the tether line, the lift structure and spring being configured so that (1) the teeth are lifted away from the tether line to a disengagement position when the tension on the tether line is above a predetermined amount and (2) the teeth are urged to engage the tether line and stop retrieval of the tether line when tension on the tether line is below a predetermined amount.

18. A retriever device for applying a tension to a tether line and retrieving an object towards the retriever device, comprising:
   a) a structural unit;
   b) a tether line extending from the structural unit;
   c) a spool mounted for rotation on the structural unit and dimensioned to hold the tether line;
   d) a spring motor mounted on the structural unit and connected to the spool for allowing removal of the tether line from the spool and for providing a force to wind the spool and retrieve the tether line onto the spool;
   e) a limiter body;
   f) a pivotal mount connected to the limiter body and the structural unit to pivotally mount the limiter body to the structural unit;
   g) a plurality of teeth formed on the limiter body at a position distal from the pivotal mount; the teeth being configured to engage and lock onto the tether line;
   h) a spring attached to the limiter body for moving the limiter body in a first rotational direction around the pivot mount and moving the teeth toward the tether line to engage and lock the teeth onto the tether line and stop retrieval of the tether line by the motor;
   i) a roller attached to the limiter body, the tether line extending from the spool and around the roller such that tension on the tether line will rotate the limiter body in a second direction moving the teeth away from the tether line to disengage the teeth from the tether line and allow retrieval of the tether line by the motor;
   j) the spring being sized and configured to rotate the limiter in the first direction when the tension on the tether line is below a predetermined amount and thereby prevent retrieval by the motor; and k) the roller and tether line being positioned such that the tether line will rotate the limiter body in the second direction overcoming the spring and disengaging the teeth from the tether line to allow retrieval of the tether line by the motor when tension on the tether line is above a predetermined amount.

* * * * *